(12) United States Patent
Tamba et al.

(10) Patent No.: US 12,528,385 B2
(45) Date of Patent: Jan. 20, 2026

(54) ELECTRIC WORKING MACHINE AND METHOD OF ACTIVATING ELECTRIC WORKING MACHINE

(71) Applicant: KUBOTA CORPORATION, Osaka (JP)

(72) Inventors: Daiki Tamba, Sakai (JP); Tsunehiro Il, Sakai (JP); Shunya Takase, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/731,688

(22) Filed: Jun. 3, 2024

(65) Prior Publication Data

US 2024/0424951 A1 Dec. 26, 2024

(30) Foreign Application Priority Data

Jun. 22, 2023 (JP) .................................. 2023-102680

(51) Int. Cl.
*B60L 58/18* (2019.01)
*E02F 9/20* (2006.01)
(Continued)

(52) U.S. Cl.
CPC ............ *B60L 58/18* (2019.02); *E02F 9/2091* (2013.01); *G01R 31/007* (2013.01);
(Continued)

(58) Field of Classification Search
CPC .... B60L 58/18; B60L 2200/40; E02F 9/2091; E02F 9/2095; E02F 9/20; G01R 31/007;
(Continued)

(56) References Cited

U.S. PATENT DOCUMENTS

2012/0186887 A1 7/2012 Moriguchi et al.
2016/0368393 A1 12/2016 Yamashiro et al.
(Continued)

FOREIGN PATENT DOCUMENTS

| EP | 3780329 B1 | 10/2022 |
| JP | 2011-188789 A | 9/2011 |
| WO | 2015/167024 A1 | 11/2015 |

OTHER PUBLICATIONS

Official Communication issued in corresponding European Patent Application No. 24179498.1, mailed on Apr. 7, 2025, 12 pages.

*Primary Examiner* — Rexford N Barnie
*Assistant Examiner* — Xuan Ly
(74) *Attorney, Agent, or Firm* — Keating & Bennett, LLP

(57) ABSTRACT

An electric working machine includes an electric device, electric circuitry, battery packs to be connected sequentially to the electric device such that they are connected in parallel, and a controller. The electric circuitry includes external relays corresponding to the respective battery packs. The controller is configured or programmed to specify each battery pack as being a battery pack requiring a test process to examine opening and closing actions of internal relay(s) of the battery pack or a battery pack not requiring the test process, and in connecting the battery packs to the electric device, perform the test process on battery pack(s) that have been specified as requiring the test process to examine the opening and closing actions, and not perform the test process on battery pack(s) that have been specified as not requiring the test process to examine the opening and closing actions.

13 Claims, 9 Drawing Sheets

(51) Int. Cl.
  *G01R 31/00* (2006.01)
  *G01R 31/367* (2019.01)
  *H01M 10/42* (2006.01)
  *H01M 10/48* (2006.01)
  *H01M 50/204* (2021.01)
  *H01M 50/249* (2021.01)
  *H02J 7/00* (2006.01)

(52) U.S. Cl.
  CPC ........ *G01R 31/367* (2019.01); *H01M 10/425* (2013.01); *H01M 10/4285* (2013.01); *H01M 10/482* (2013.01); *H01M 50/204* (2021.01); *H01M 50/249* (2021.01); *H02J 7/0063* (2013.01); *H02J 7/0069* (2020.01); *B60L 2200/40* (2013.01); *E02F 9/2095* (2013.01); *H01M 2010/4271* (2013.01); *H01M 2220/20* (2013.01)

(58) Field of Classification Search
  CPC ... G01R 31/367; G01R 31/00; H01M 10/425; H01M 10/4285; H01M 10/482; H01M 50/204; H01M 50/249; H01M 2010/4271; H01M 2220/20; H01M 10/42; H01M 10/48; H02J 7/0063; H02J 7/0069; H02J 7/0025; H02J 7/0032; H02J 7/0047; H02J 7/00
  USPC .......................................................... 307/9.1
  See application file for complete search history.

(56) References Cited

U.S. PATENT DOCUMENTS

2021/0005938 A1\* 1/2021 Hayashi ................ H01M 10/48
2022/0216704 A1   7/2022 Klintberg et al.

\* cited by examiner

Fig.6

| | First test | | Second test | | Third test | | Fourth test |
|---|---|---|---|---|---|---|---|
| | Controller's instructions to open/close | Voltage outputted (Voltage increased) Diagnosis | Controller's instructions to open/close | Voltage outputted (Voltage increased) Diagnosis | Controller's instructions to open/close | Voltage outputted (Voltage increased) Diagnosis | Controller's instructions to open/close | Output voltage did not increase Diagnosis |
| External relay | Close | First internal relay or second internal relay or pre-charge relay is locked in closed state | Close | First internal relay or pre-charge relay is locked in closed state | Close | Second internal relay is locked in closed state | Close | Second internal relay or pre-charge relay is locked in open state, or discharge relay is locked in closed state |
| First internal relay | Open | | Open | | Open | | Close | |
| Second internal relay | Open | | Close | | Open | | Close | |
| Pre-charge relay | Open | | Open | | Close | | Close | |
| Discharge relay | Open | | Open | | Open | | Open | |

| | Fifth test | | Sixth test | | Seventh test | |
|---|---|---|---|---|---|---|
| | Controller's instructions to open/close | Output voltage did not increase Diagnosis | Controller's instructions to open/close | Output voltage did not decrease Diagnosis | Controller's instructions to open/close | Output voltage did not decrease Diagnosis |
| External relay | Close | First internal relay is locked in open state | Close | First internal relay or second internal relay is locked in open state, or discharge relay is locked in open state | Close | Discharge relay is locked in open state, or discharge resistor has melted through, or first internal relay or second internal relay is locked in open state |
| First internal relay | Close | | Open | | Open | |
| Second internal relay | Close | | Close | | Open | |
| Pre-charge relay | Open | | Open | | Open | |
| Discharge relay | Open | | Close | | Open | |

ELECTRIC WORKING MACHINE AND METHOD OF ACTIVATING ELECTRIC WORKING MACHINE

CROSS REFERENCE TO RELATED APPLICATIONS

This application claims the benefit of priority to Japanese Patent Application No. 2023-102680 filed on Jun. 22, 2023. The entire contents of this application are hereby incorporated herein by reference.

BACKGROUND OF THE INVENTION

1. Field of the Invention

The present invention relates to electric working machines each powered by electricity supplied from a plurality of battery packs.

2. Description of the Related Art

There are electric working machines powered by electricity from a plurality of battery packs (assembled batteries). Such an electric working machine includes a working device, an electric device to actuate the working device, electric circuitry electrically connected to the electric device, and a plurality of battery packs each of which includes internal relay(s) to open and close an internal circuit and which are connected in parallel to the electric device via the electric circuitry. Such an electric working machine is configured such that, when the working device is actuated (when the electric device is activated), the internal relays of the battery packs are concurrently brought from the open state to the closed state, so that the battery packs are electrically connected to the electric device (see, for example, PCT International Application Publication No. 2015/167024 and Japanese Unexamined Patent Application Publication No. 2011-188789).

SUMMARY OF THE INVENTION

It is noted that, when the internal relays of a battery pack are repeatedly brought into the closed state and the open state and inrush current acts on the internal relays, their contacts may be locked (fused). When the contacts of the internal relays are locked in such a way, the internal circuit can be energized. Therefore, when the electric circuitry is connected electrically to the electric device (electrical load), inrush current acts on the internal circuit of the battery pack, and the internal circuit may be damaged.

Accordingly, an operating test for internal relays prior to their activation (testing the opening and closing actions) could be considered, but in the case where there is a plurality of battery packs, a test (examination) on the internal relays corresponding to the number of battery packs would be necessary, and therefore the time needed for testing internal relays would become longer. That is, the time of activation of the electric device (the time for a plurality of battery packs to be connected to the electric working device) would become longer.

Example embodiments of the present invention provide electric working devices and methods to activate electric working devices each of which can connect a plurality of battery packs to an electric device within a short time.

An electric working machine according to an example embodiment of the present invention includes an electric device, electric circuitry electrically connected to the electric device, battery packs to be connected sequentially to the electric device via the electric circuitry such that the battery packs are connected in parallel, the battery packs each including at least one internal relay to open and close an internal circuit, and a controller, wherein the electric circuitry includes external relays corresponding to the respective battery packs to open and close respective circuits connecting the respective corresponding battery packs to the electric device, and the controller is configured or programmed to specify each of the battery packs as being a battery pack requiring a test process to examine opening and closing actions of the at least one internal relay or a battery pack not requiring the test process, and in connecting the battery packs to the electric device, perform the test process on one or more of the battery packs that have been specified as requiring the test process to examine the opening and closing actions, and not perform the test process on one or more of the battery packs that have been specified as not requiring the test process to examine the opening and closing actions.

An electric working machine according to an example embodiment of the present invention includes an electric device, electric circuitry electrically connected to the electric device, battery packs to be connected sequentially to the electric device via the electric circuitry such that the battery packs are connected in parallel, the battery packs each including at least one internal relay to open and close an internal circuit, and a controller, wherein the electric circuitry includes external relays corresponding to the respective battery packs to open and close respective circuits connecting the respective corresponding battery packs to the electric device, each of the battery packs includes a pre-charge circuit, the pre-charge circuit including a series circuit including a pre-charge resistor and a pre-charge relay and connected in parallel to the at least one internal relay, and the controller is configured or programmed to specify each of the battery packs as a battery pack requiring pre-charging in which the pre-charge relay is brought into the closed state before the at least one internal relay is brought into the closed state or as a battery pack not requiring the pre-charging, in connecting one or more of the battery packs that have been specified as being a battery pack requiring the pre-charging to the electric device, perform the pre-charging and then perform a first connecting process to bring the at least one internal relay of the one or more of the battery packs into the closed state, and in connecting one or more of the battery packs that have been specified as a battery pack not requiring the pre-charging to the electric device, not perform the pre-charging and perform the first connecting process.

A method of activating an electric working machine according to an example embodiment of the present invention is a method of activating an electric working machine including an electric device, electric circuitry electrically connected to the electric device, and battery packs to be connected sequentially to the electric device via the electric circuitry such that the battery packs are connected in parallel, the battery packs each including at least one internal relay to open and close an internal circuit, wherein the electric circuitry includes external relays corresponding to the respective battery packs to open and close respective circuits connecting the respective corresponding battery packs to the electric device, the method including specifying each of the battery packs as being a battery pack requiring a test process to examine opening and closing actions of the at least one internal relay or a battery pack not requiring the test process, and connecting the battery packs to the electric device, the connecting including performing the test process on one or more of the battery packs that have been specified as requiring the test process, and not performing the test process on one or more of the battery packs that have been specified as not requiring the test process.

A method of activating an electric working machine according to an example embodiment of the present invention is a method of activating an electric working machine including an electric device, electric circuitry electrically connected to the electric device, and battery packs to be connected sequentially to the electric device via the electric circuitry such that the battery packs are connected in parallel, the battery packs each including at least one internal relay to open and close an internal circuit, wherein the electric circuitry includes external relays corresponding to the respective battery packs to open and close respective circuits connecting the respective corresponding battery packs to the electric device, each of the battery packs includes a pre-charge circuit, the pre-charge circuit including a series circuit including a pre-charge resistor and a pre-charge relay and connected in parallel to the at least one internal relay, the method including specifying each of the battery packs as a battery pack requiring pre-charging in which the pre-charge relay is brought into the closed state before the at least one internal relay is brought into the closed state or as a battery pack not requiring the pre-charging, and connecting the battery packs to the electric device, the connecting including, on one or more of the battery packs that has been specified as being a battery pack requiring the pre-charging, performing the pre-charging and then performing a first connecting process to bring the at least one internal relay of the one or more of the battery packs into the closed state, and on or more of the battery packs that has been specified as a battery pack not requiring the pre-charging, not performing the pre-charging and performing the first connecting process.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 6, which relates to testing the opening and closing actions of internal relays of battery packs in an electric working machine according to an example embodiment of the present invention, is a list of conditions and results of each test.

DETAILED DESCRIPTION OF THE EXAMPLE EMBODIMENTS

Figure 1:
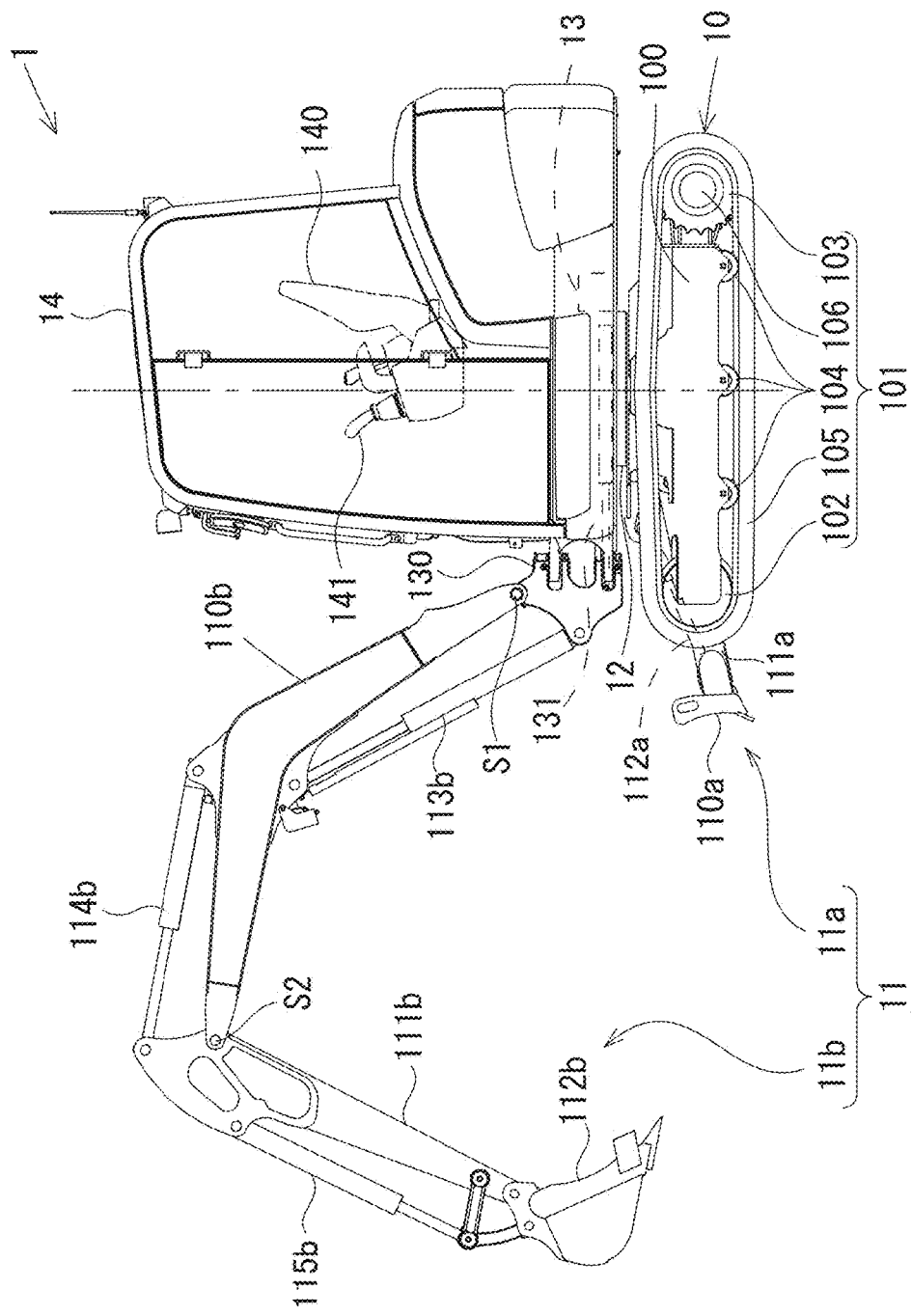
FIG. 1 is a side view of an electric working machine according to an example embodiment of the present invention.

Example embodiments will now be described with reference to the accompanying drawings, wherein like reference numerals designate corresponding or identical elements throughout the various drawings. The drawings are to be viewed in an orientation in which the reference numerals are viewed correctly.

The following description discusses electric working machines according to example embodiments of the present invention with reference to the drawings. In the following description, each "former" process refers to a process belonging to a former process group, and each "latter" process refers to a process belonging to a latter process group; and each of the "former" and "latter" process groups includes "first", "second" processes, etc., which means that the "former" process group is subdivided into several "former" processes numbered in order, and similarly, the "latter" process group is subdivided into several "later" processes numbered in order. The term "former" indicates that the "former" process group is to be performed before the "latter" process group.

As illustrated in FIG. 1, an electric working machine 1 is a self-propelled working machine, and includes a traveling device 10.

The traveling device 10 includes a travel frame 100 and travel mechanism(s) 101. The travel frame 100 is a structure to have the travel mechanism(s) 101 attached thereto.

The travel mechanisms 101 are provided at the left and right portions of the travel frame 100. That is, a pair of such travel mechanisms 101 are arranged in a width direction perpendicular to the direction of forward/rearward travel.

In the present example embodiment, the travel mechanisms 101 are crawler travel mechanisms. Specifically, each travel mechanism 101 includes an idler 102, a driving wheel 103, a plurality of track rollers 104, an endless crawler belt 105, and a travel motor 106.

The idler 102 is located at a front portion at the leading end in the direction of forward travel of the travel frame 100. The driving wheel 103 is located at a rear portion at the leading end in the direction of rearward travel of the travel frame 100. The track rollers 104 are located between the idler 102 and the driving wheel 103. The crawler belt 105 is looped over the idler 102, the driving wheel 103, and the track rollers 104.

The travel motor 106 drives the driving wheel 103 to rotate. In the present example embodiment, the travel motor 106 includes a hydraulic motor. Each of the left and right pair of travel mechanisms 101 propels the crawler belt 105 to turn due to the rotation of the driving wheel 103.

The electric working machine 1 according to the present example embodiment includes a working device 11 to perform work. The working machine 1 also includes a swivel base 12 secured to the travel frame 100, a machine body 13 supported on the swivel base 12, and a cabin 14 supported on the machine body 13.

In the present example embodiment, the working device 11 of the electric working machine 1 includes a dozer device 11a and a shovel device 11b.

The dozer device 11a is located forward of the traveling device 10. Specifically, the dozer device 11a includes a dozer plate 110a, a support arm 111a which has the dozer plate 110a attached to the distal end thereof and which is attached to the travel frame 100 via a lateral shaft such that the support arm 111a is swingable up and down about the shaft, and a hydraulic cylinder 112a to cause the support arm 111a to swing.

The shovel device 11b includes a boom 110b, an arm 111b, a bucket 112b which is a working tool, and hydraulic cylinders 113b, 114b, and 115b.

The boom 110b includes a proximal portion and a distal portion. The proximal portion of the boom 110b is pivoted on a swing bracket 130 (described later) via a first shaft S1 extending in a direction perpendicular to the up-and-down direction. Accordingly, the boom 110b is configured such that the distal portion thereof is swingable up and down by rotating (pivoting) about the first shaft S1.

The arm 111b includes a proximal portion and a distal portion. The proximal portion of the arm 111b is pivoted on the distal portion of the boom 110b via a second shaft S2 extending in a direction perpendicular to the up-and-down direction. Accordingly, the arm 111b is configured such that the distal portion thereof is swingable forward, rearward, upward, and downward by rotating (pivoting) about the second shaft S2. The bucket 112b is connected to the distal portion of the arm 111b such that the bucket 112b can perform shoveling and dumping actions.

The hydraulic cylinders of the working device 11 of the electric working machine 1 include a boom cylinder 113b to swing the boom 110b, an arm cylinder 114b to swing the arm 111b, and a bucket cylinder 115b to cause the bucket 112b to perform shoveling and dumping actions. The electric working machine 1 also includes a swing cylinder 131 (hydraulic cylinder) to swing the swing bracket 130.

The swivel base 12 is a slewing bearing including an inner ring and an outer ring, one of which is connected to the travel frame 100 and the other is connected to the machine body 13. The swivel base 12 includes a pinion attached to the output shaft of a swivel motor 120 (see FIG. 2) secured to one of the machine body 13 and the travel frame 100, and a ring gear teeth in the inner circumference of the inner ring or in the outer circumference of the outer ring connected to the other of the machine body 13 and the travel frame 100, such that the pinion and the ring gear mesh with each other. With this, the swivel base 12, when driven by the swivel motor 120, causes the inner ring and the outer ring to rotate relative to each other about an axis extending in the up-and-down direction, and causes the machine body 13 connected to the other of the inner and outer rings to rotate about an axis extending in the up-and-down direction. In the present example embodiment, the swivel motor 120 includes a hydraulic motor.

The machine body 13 has the swing bracket 130 connected to its front portion at the leading end in the direction of forward travel. Specifically, the swing bracket 130 is pivoted on the machine body 13 via a shaft extending in the up-and-down direction. With this, the swing bracket 130 is rotatable (pivotable) about the shaft extending in the up-and-down direction. That is, the swing bracket 130 is configured to swing left and right upon extension and retraction of the swing cylinder 131. The machine body 13 supports the cabin 14. The cabin 14 houses a seat 140 for a user, an operator (manual operator) 141 to be operated to control the electric working machine 1, an activation switch used to activate the electric working machine 1 (the traveling device 10 and the working device 11), a monitor 142 (see FIG. 2) as a notifier to provide a notification indicating operational status, etc., to the user, and/or the like.

Figure 2:
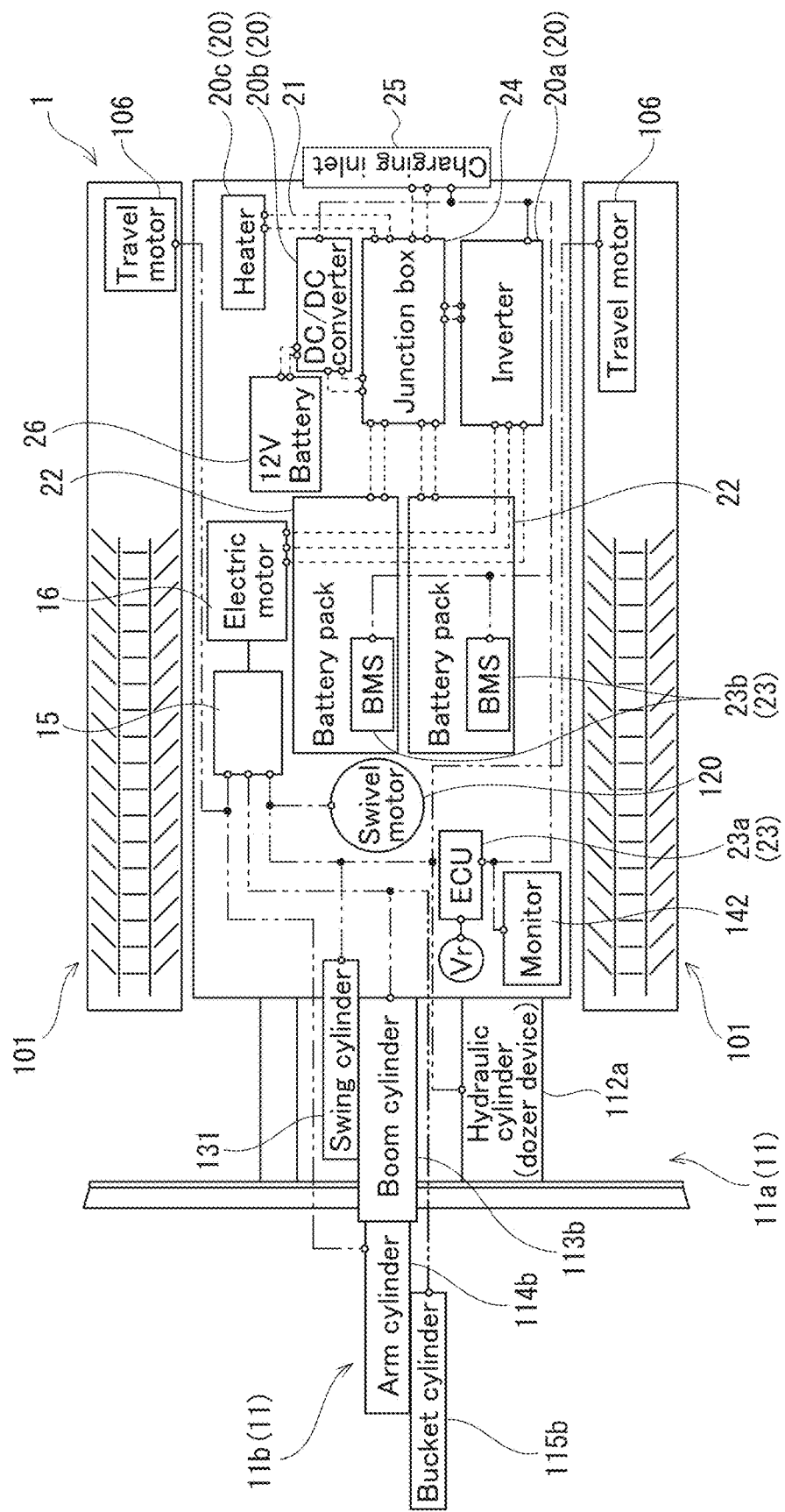
FIG. 2 schematically illustrates a hydraulic system and an electric system of an electric working machine according to an example embodiment of the present invention.

Since the traveling device 10 (travel mechanisms 101), the working device 11 (dozer device 11a, shovel device 11b, etc.), and the swivel base 12 include a plurality of hydraulic actuators such as the hydraulic cylinders 112a, 113b, 114b, 115b, and 131 and the hydraulic motors 106 and 120, the electric working machine 1 includes a hydraulic pump 15 to supply hydraulic fluid to the hydraulic actuators 106, 112a, 113b, 114b, 115b, 120, and 131 (see FIG. 2). In the present example embodiment, the hydraulic pump 15 includes a multiple hydraulic pump in order to supply hydraulic fluid to the hydraulic actuators 106, 112a, 113b, 114b, 115b, 120, and 131.

The hydraulic pump (multiple hydraulic pump) 15 is an electric pump. That is, the electric working machine 1 includes an electric motor 16 to drive the hydraulic pump 15.

In the present example embodiment, assuming that the electric working machine 1 is configured as described above, the electric working machine 1 includes electric device(s) 20, electric circuitry 21 electrically connected to the electric device(s) 20, a plurality of battery packs 22 to be connected sequentially to the electric device(s) 20 via the electric circuitry 21 such that the battery packs 22 are connected in parallel, and a controller 23. The electric working machine 1 further includes a junction box 24 to house the electric circuitry 21 entirely or partially. Note that, in FIG. 2, the electric circuitry 21 is represented by dash lines, a signal system for transmission and reception of control signals is represented by dot-dash lines, and a hydraulic system is represented by dot-dot-dash lines.

In the present example embodiment, the electric working machine 1 includes a plurality of the electric devices 20. Specifically, the electric working machine 1 includes, as an electric device 20 for output, an inverter 20a to drive the electric motor 16. That is, the electric working machine 1 includes an electric device 20 to drive the working device 11 to perform work (the dozer device 11a and the shovel device 11b in the present example embodiment).

The electric working machine 1 includes, as other electric devices 20 for output, a DC/DC converter 20b and a heater 20c to heat the interior of the cabin 14. Note that such other electric devices 20 for output are merely examples, and some other device(s) may be added depending on the specifications and functions etc. of the electric working machine 1.

The electric working machine 1 includes, as an electric device 25 for input, a charging inlet for connection with an external charger (e.g. fast charger). Note that, in the present example embodiment, the DC/DC converter 20b is connected not only to the battery packs 22 but also to a 12V battery 26.

Figure 3:
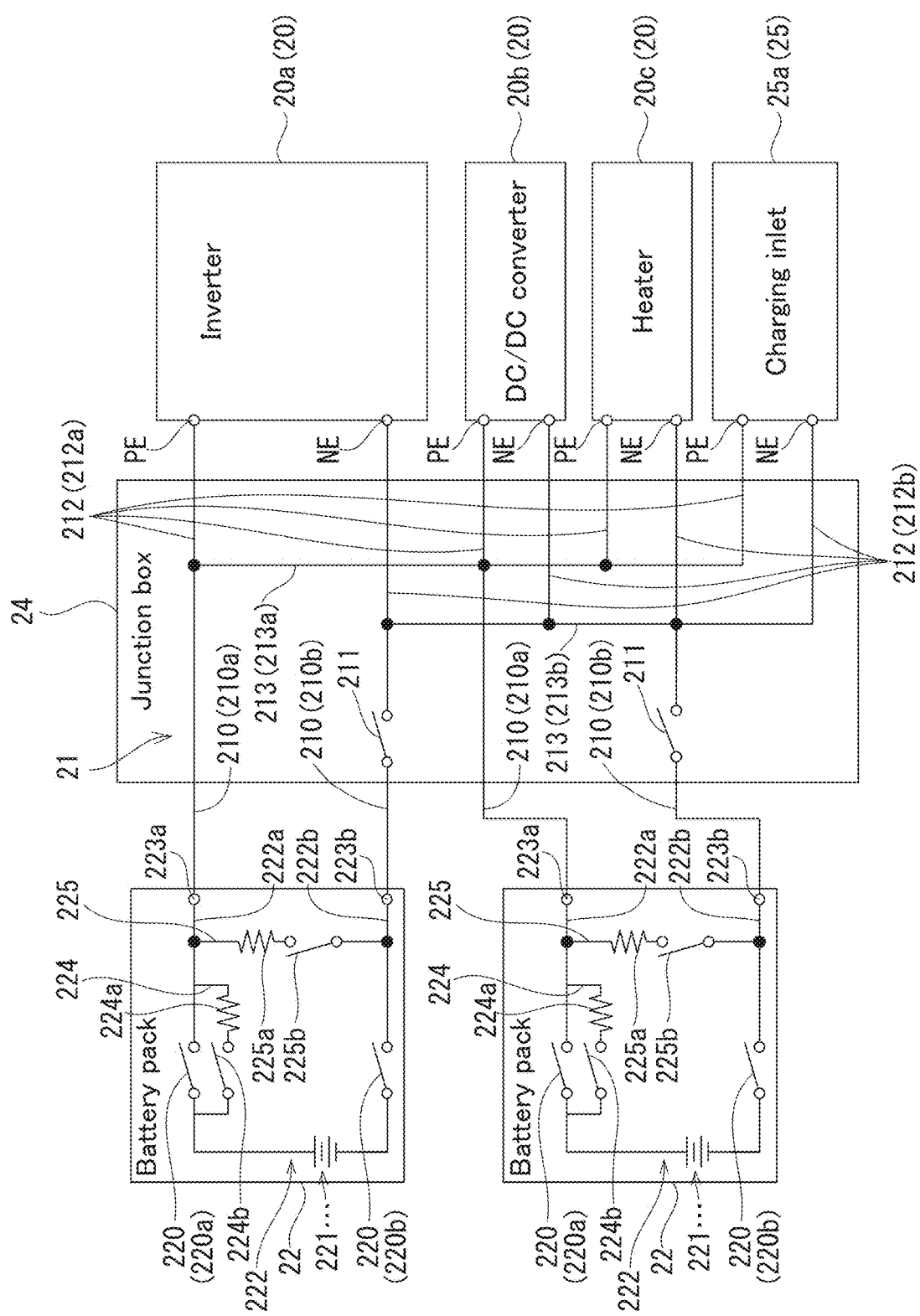
FIG. 3 is an electric block diagram of an electric working machine according to an example embodiment of the present invention.

As illustrated in FIG. 3, each of the electric devices 20, 25 for output and for input includes a positive terminal PE and a negative terminal NE.

The electric circuitry 21 includes a plurality of external relays 211 corresponding to the respective battery packs 22. Specifically, the electric circuitry 21 includes (i) a plurality of primary circuits 210 electrically and physically connected to the respective battery packs 22 and electrically connected to the electric devices 20 for output (inverter 20a, DC/DC converter 20b, heater 20c) and the electric device 25 for input (charging inlet 25), and (ii) a plurality of external relays 211 to open and close the respective primary circuits 210.

In the present example embodiment, as described above, the electric working machine 1 includes electric devices 20 for output (inverter 20a, DC/DC converter 20b, heater 20c) and an electric device 25 for input (charging inlet 25). Accordingly, the electric circuitry 21 includes a plurality of secondary circuits 212 electrically and physically connected to the electric devices 20 for output (inverter 20a, DC/DC converter 20b, heater 20c) and the electric device 25 for input (charging inlet) 25.

Specifically, the electric circuitry 21 includes the primary circuits 210 connected to the respective battery packs 22, common circuit(s) 213 electrically and physically connected to the primary circuits 210, and the secondary circuits 212 electrically and physically connected to the common circuit 213 and connected respectively to the electric devices 20 for output (inverter 20a, DC/DC converter 20b, heater 20c) and the electric device for input (charging inlet) 25.

In the electric circuitry 21, the battery packs 22 are connected in parallel by connecting the primary circuits 210 to the common circuit 213. More specifically, the primary circuits 210 of the electric circuitry 21 include a plurality of positive primary circuit pathways 210a connected to respective positive output terminals 223a (positive external terminals, described later) of the respective battery packs 22, and a plurality of negative primary circuit pathways 210b connected to respective negative output terminals 223b (negative external terminals, described later) of the respective battery packs 22.

The common circuit 213 of the electric circuitry 21 includes a positive common circuit pathway 213a connected to the positive primary circuit pathways 210a, and a negative common circuit pathway 213b connected to the negative primary circuit pathways 210b. The secondary circuits 212 of the electric circuitry 21 include a plurality of positive secondary circuit pathways 212a connected to the positive common circuit pathway 213a and connected to the respective positive terminals PE of the electric devices 20 for output (inverter 20a, DC/DC converter 20b, heater 20c) and the electric device 25 for input (charging inlet 25), and a plurality of negative secondary circuit pathways 212b connected to the negative common circuit pathway 213b and connected to the respective negative terminals NE of the electric devices 20 for output (inverter 20a, DC/DC converter 20b, heater 20c) and the electric device 25 for input (charging inlet 25).

The external relays 211 are located in the respective positive primary circuit pathways 210a or the respective negative primary circuit pathways 210b. In the present example embodiment, the external relays 211 are located in the respective negative primary circuit pathways 210b. Each external relay 211 is a "form A" relay switch. Specifically, the external relay 211 is a relay switch to normally keep the electric circuitry 21 in an open (disconnected) state and bring the electric circuitry 21 into a closed (connected) state upon actuation. The external relay 211 is actuated in response to an instruction from the controller 23 (ECU 23a) to open or close the electric circuitry 21.

With this, the external relays 211 are capable of opening and closing the circuitry (electrical system) connecting the battery packs 22 to the electric devices 20 for output (inverter 20a, DC/DC converter 20b, heater 20c). The external relays 211 are also capable of opening and closing the circuitry (electrical system) connecting the battery packs 22 to the electric device 25 for input (charging inlet 25).

Each of the battery packs 22 includes an internal circuit 222 and internal relay(s) 220 to open and close the internal circuit 222. Each of the battery packs 22 also includes cell(s) (electric cell(s)) 221. Specifically, each of the battery packs 22 includes a plurality of cells 221. That is, each battery pack 22 is a so-called assembled battery. Accordingly, each of the battery packs 22 includes an internal circuit 222 including the cells 221 connected in series. That is, the internal circuit 222 is a series circuit in which the cells 221 and the internal relay(s) 220 are connected in series.

Each battery pack 22 includes positive and negative external terminals 223a and 223b which are terminals of the internal circuit 222. That is, the battery pack 22 includes the positive output terminal 223a as an external terminal and the negative output terminal 223b as an external terminal. The positive output terminal 223a is electrically connected to the positive terminal of one of the serially connected cells 221 that is located at one of opposite ends, and the negative output terminal 223b is electrically connected to the negative terminal of another one of the serially connected cells 221 that is located at the other of the opposite ends.

Specifically, the internal circuit 222 includes (i) the cells 221 connected in series, (ii) a first circuit pathway 222a including the first internal relay 220a (positive internal relay) which is one of the internal relays 220 and connecting the positive output terminal 223a and the positive terminal of one of the serially connected cells 221 that is located at one of opposite ends, and (iii) a second circuit pathway 222b including the second internal relay 220b (negative internal relay) which is the other of the internal relays 220 and connecting the negative output terminal 223b and the negative terminal of another of the serially connected cells 221 that is located at the other of the opposite ends.

Each of the internal relays 220 (the first internal relay 220a and the second internal relay 220b) is a "form A" relay switch. Specifically, each of the internal relays 220 (the first internal relay 220a and the second internal relay 220b) is a relay switch to normally keep the internal circuit 222 in the open state and bring the internal circuit 222 into the closed state upon actuation.

In the present example embodiment, the internal circuit 222 includes a pre-charge circuit 224 connected in parallel to the first internal relay 220a of the first circuit pathway 222a. The pre-charge circuit 224 is connected to the portion of the first circuit pathway 222a that is located on the primary side (upstream side) of the first internal relay 220a and to the portion of the first circuit pathway 222a that is located on the secondary side (downstream side) of the first internal relay 220a, and includes a pre-charge resistor 224a and a pre-charge relay 224b to open and close the pre-charge circuit 224. The pre-charge relay 224b is a "form A" relay switch. Specifically, the pre-charge relay 224b is a relay switch to normally keep the pre-charge circuit 224 in the open state and bring the pre-charge circuit 224 into the closed state upon actuation. In the pre-charge circuit 224, the pre-charge resistor 224a and the pre-charge relay 224b are connected in series. That is, the pre-charge resistor 224a and the pre-charge relay 224b are connected to define a series circuit, and the pre-charge circuit 224 including the series circuit (the pre-charge resistor 224a and the pre-charge relay 224b) is connected in parallel to the first internal relay 220a.

Each battery pack 22 (internal circuit 222) includes a discharge circuit 225. The discharge circuit 225 is connected to the first circuit pathway 222a and the second circuit pathway 222b. Specifically, the discharge circuit 225 connects the portion of the first circuit pathway 222a that is downstream of the first internal relay 220a and the portion of the second circuit pathway 222b that is upstream of the second internal relay 220b. It is noted here that the "upstream" and "downstream" are based on the direction of electric current (flow of electricity) passing through the cells 221 (cells 221 connected in series) of the internal circuit 222 of the battery pack 22.

The discharge circuit 225 includes a discharge resistor 225a and a discharge relay 225b to open and close the discharge circuit 225. The discharge relay 225b is a "form A" relay switch. That is, the discharge relay 225b is a relay switch to normally keep the discharge circuit 225 in the open (disconnected) state and bring the discharge circuit 225 into the closed (connected) state upon actuation. The discharge resistor 225a and the discharge relay 225b of the discharge circuit 225 are connected in series.

The controller 23 is configured or programmed to control opening/closing of the electric circuitry 21 and the internal circuits 222 of the battery packs 22. Specifically, the controller 23 controls the opening/closing of the external relays 211 of the electric circuitry 21 as well as the opening/closing of the internal relays 220 (the first internal relays 220a and the second internal relays 220b), the pre-charge relays 224b, and the discharge relays 225b of the internal circuits 222 of the battery packs 22. The controller 23 includes a driving mode in which the controller 23 drives electric device(s) 20 using electricity supplied from the battery pack(s) 22 and a charging mode in which the controller 23 charges the battery pack(s) 22. More specifically, as illustrated in FIG. 2, the controller 23 of the electric working machine 1 includes an electronic control unit (hereinafter referred to as "ECU") 23a to control the entire electric working machine 1. In the present example embodiment, the source of electricity is battery pack(s) 22 which is/are assembled battery (batteries). Accordingly, the controller 23 of the electric working machine 1 includes battery management systems (hereinafter referred to as "BMSs") 23b to monitor and control the battery packs 22. Accordingly, in the present example embodiment, the ECU 23a and the BMSs 23b of the controller 23 control the opening/closing of relay switches (the external relays 211 in the electric circuitry 21, the internal relays 220 (the first internal relays 220a and the second internal relays 220b), the pre-charge relays 224b, and the discharge relays 225b in the internal circuits 222 of the battery packs 22). Specifically, the ECU 23a issues instructions relating to the opening/closing of relay switch(es), and each BMS 23b causes the relay switch(es) to open or close in response to the instruction from the ECU 23a.

In the present example embodiment, the ECU 23a connects the battery packs 22 sequentially to electric device(s) 20. Accordingly, the battery packs 22 include a first battery pack 22 determined to be connected first to the electric device 20, and second battery pack(s) 22 determined to be connected second or later to the electric device 20. Specifically, the battery packs 22 are connected one by one to the electric device 20 such that the battery packs 22 are eventually connected in parallel, so that each battery pack 22 supplies electricity to the electric device 20.

Accordingly, in the following description, one of the battery packs 22 that is to be connected first to the electric device 20 is referred to as a first battery pack, and another one or more of the battery packs 22 each of which is to be connected second or later to the electric device 20 is/are each referred to as a second battery pack. Note that, in a case that the number of the battery packs 22 is two, the battery packs 22 include a single first battery pack 22 and a single second battery pack 22, whereas, in a case that the number of the battery packs 22 is three or more, the battery packs 22 include a single first battery pack 22 and two or more second battery packs 22.

Assuming the above configuration, the ECU 23a is configured or programmed to specify whether a test to examine the opening and closing actions of the internal relays 220 of the second battery pack(s) 22 to be connected to the electric device(s) 20 is required or not (is to be performed or not). The ECU 23a is also configured or programmed to specify whether pre-charging using the pre-charge circuit 224 of each second battery pack 22 is required. The ECU 23a is also configured or programmed to specify whether to bring the first internal relay 220a and the second internal relay 220b (internal relays 220) concurrently into the closed state when connecting the second battery pack 22 to the electric device(s) 20 (when performing a first latter process, described later).

Such specifications are made in the following manner. A storing unit (storage and/or memory) of the ECU 23a stores predetermined specifications (unchangeable predetermined information) or stores specifications inputted via an input (changeable information). Note that the input may be configured only for input, but, for example, the monitor 142 which is a notifier may include a touchscreen such that the information can be inputted via the monitor 142.

In the present example embodiment, with regard to the above-described specifications, the storing unit of the ECU 23a stores predetermined specifications (unchangeable predetermined information). Specifically, with regard to the specification of whether a test to examine the opening and closing actions of the internal relays 220 of the second battery pack(s) 22 is required, the storing unit of the ECU 23a stores a specification (instruction) indicating that the test to examine the opening and closing actions is not required. With regard to the specification of whether pre-charging using the pre-charge circuit 224 of the second battery pack(s) 22 is required, the storing unit of the ECU 23a stores a specification (instruction) indicating that the pre-charging is not required. With regard to the specification of whether to bring the first internal relay 220a and the second internal relay 220b (internal relays 220) concurrently into the closed state when connecting the second battery pack(s) 22 to the electric device(s) 20 (when performing a first latter process, described later), the storing unit of the ECU 23a stores a specification (instruction) indicating bringing the first internal relay 220a and the second internal relay 220b concurrently into the closed state.

The electric working machine 1 includes an activation switch and is configured to be activated or stopped by turning on or off the activation switch. In the present example embodiment, when the activation switch is turned on, the controller 23 (ECU 23a) performs the driving mode in which the controller 23 (ECU 23a) drives the electric device(s) 20 using electricity supplied from the battery pack(s) 22. That is, the ECU 23a performs an activation process when the activation switch is turned on.

Each BMS 23b is a controller specifically for the corresponding battery pack 22. The ECU 23a is a controller superordinate to the BMSs 23b. That is, each BMS 23b controls the opening/closing etc. of the internal relays 220 (220a, 220b), but is under the control of the ECU 23a and follows instructions/commands from the ECU 23a.

Each battery pack 22 includes the BMS 23b. The BMS 23b is configured or programmed to monitor (measure) the temperature, electric current, and voltage of the battery pack 22 as a whole. Note that the electric current and voltage of the battery pack 22 as a whole indicate the electric current and voltage between the positive output terminal 223a and the negative output terminal 223b (external terminals) of the battery pack 22. Note that, although the BMS 23b is configured or programmed to monitor (measure) the battery pack 22 as a whole in the present example embodiment, the BMS 23b may be configured or programmed to monitor (measure) the temperature, voltage, and electric current of a plurality of cells 221 in the battery pack 22 instead of or in addition to monitoring (measuring) those of the battery pack 22 as a whole.

The junction box 24 is a housing with an openable/closable door (not illustrated) to house the electric circuitry 21. In the present example embodiment, the junction box 24 houses downstream portions of the primary circuits 210 (210b, 210a), the common circuit 213 (213b, 213a), and upstream portions of the secondary circuits 212 (212b, 212a). That is, the junction box 24 houses the portions of the primary circuits 210 (210b, 210a) that are connected to the common circuit 213 (213b, 213a) and the portions of the secondary circuits 212 (212b, 212a) that are connected to the common circuit 213 (213b, 213a).

The junction box 24 also houses the external relays 211 in the primary circuits 210 (210b, 210a). Accordingly, the external relays 211 are located at intermediate positions of the primary circuits 210 (negative primary circuit pathways 210b) and housed in the junction box 24.

In the present example embodiment, the primary circuits 210 of the electric circuitry 21 include the negative primary circuit pathways 210b and the positive primary circuit pathways 210a, and the external relays 211 are provided only in the negative primary circuit pathways 210b. Accordingly, the external relays 211 are located at intermediate positions of the negative primary circuit pathways 210b such that the external relays 211 are located within the junction box 24.

The external relays 211 are replaceable. Specifically, the external relays 211 are attachable to and detachable from the junction box 24, and are replaceable in case of failure.

Note that, in the description about the electric circuitry 21, the "upstream" indicates the battery pack 22-side of a reference location in an electric circuit connecting the battery pack 22 and an electric device 20 (the same side of the reference location as the battery pack 22), whereas the "downstream" indicates the electric device 20-side of the reference location in the electric circuit connecting the battery pack 22 and the electric device 20 (the same side of the reference location as the electric device 20).

The electric working machine 1 according to the present example embodiment is configured as described above. In performing the driving mode (activation process), the controller 23 supplies the electric device(s) 20 (inverter 20a, DC/DC converter 20b, heater 20c) with electricity to cause the electric device(s) 20 (inverter 20a, DC/DC converter 20b, heater 20c) to perform their functions, in the following manner. Specifically, the inverter 20a, which is one of the electric devices 20 (inverter 20a, DC/DC converter 20b, heater 20c) that actuates the working device 11 (dozer device 11a, shovel device 11b), drives the electric motor 16 upon receipt of electricity, and the electric motor 16 actuates the hydraulic pump 15.

Figure 4:
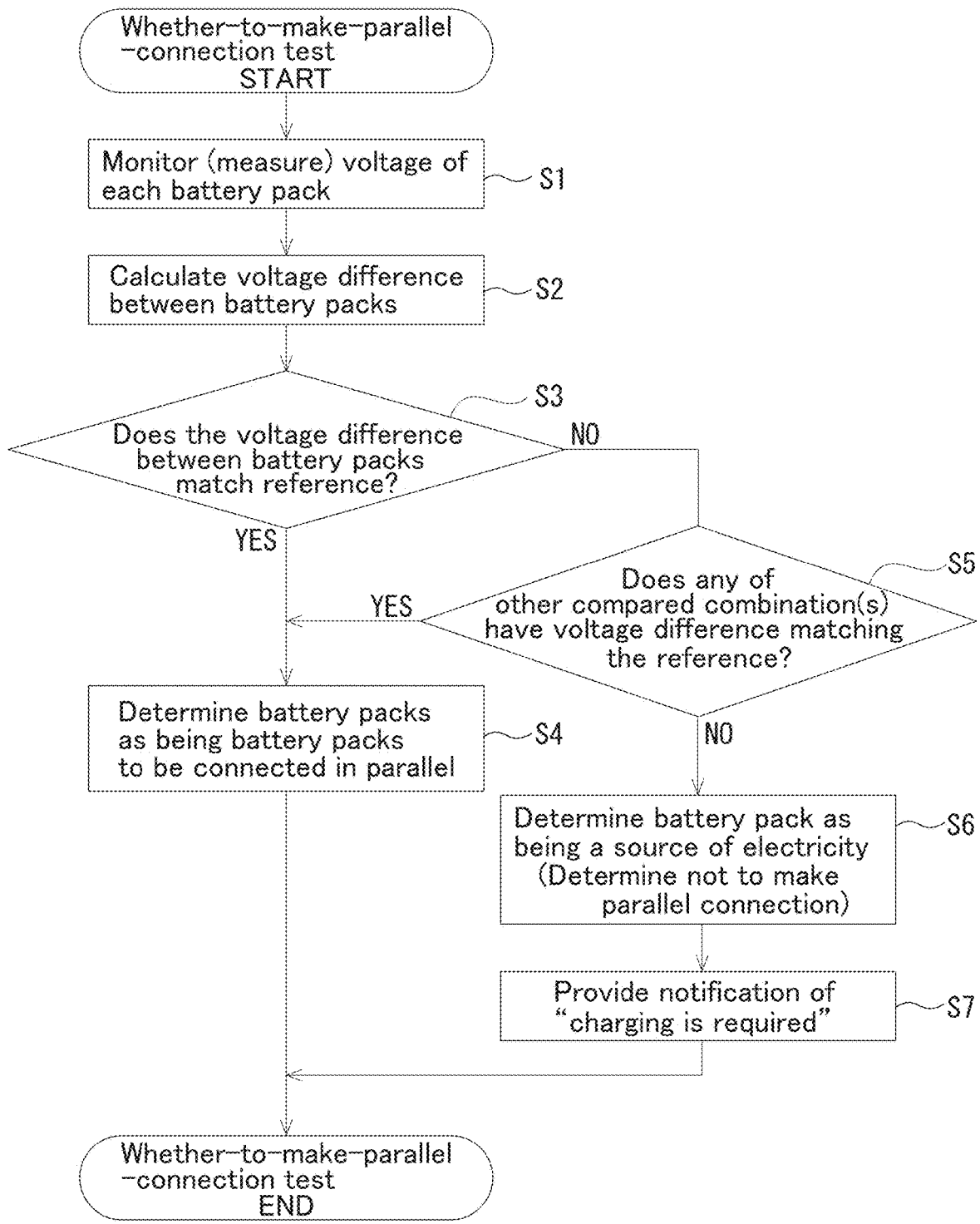
FIG. 4 is a flowchart of a whether-to-make-parallel-connection test to determine whether to connect battery packs in parallel in an electric working machine according to an example embodiment of the present invention.

Specifically, when the driving mode (activation process) is to be performed, the user first turns on the activation switch, so that the controller 23 (ECU 23a) determines whether the battery packs 22 can be connected in parallel (performs a whether-to-make-parallel-connection test). Specifically, as shown in FIG. 4, each BMS 23b measures the voltage of the corresponding battery pack 22 as a whole and sends the result thereof to the ECU 23a (S1). The ECU 23a compares the voltages of every two battery packs 22 to calculate the voltage difference between the compared battery packs 22 (the two battery packs 22) (S2). In the present example embodiment, the electric working machine 1 includes only two battery packs 22, and therefore there is only one combination of battery packs 22 to be compared. Therefore, the ECU 23a calculates the voltage difference between the two battery packs 22.

The ECU 23a determines whether the calculated voltage difference matches a predetermined reference (S3). The "reference" as used herein indicates value(s) that would not cause issues even if electricity flows between the battery packs 22 due to the voltage difference between the battery packs 22 when the battery packs 22 are connected in parallel. In the present example embodiment, the "reference" is a range with the upper threshold and the lower threshold (a range between two thresholds), i.e., the "reference" is stored in the ECU 23a, and the ECU 23a determines that the calculated voltage difference matches the "reference" if the calculated voltage difference falls within the range defined by the two thresholds. Note that the reference does not need to have a range (does not need to be a range defined by two thresholds), and may be a single threshold.

Note that the flowchart in FIG. 4 is based on the assumption that the number of battery packs 22 may be three or more. In cases where the number of battery packs 22 is three or more, there are three or more combinations of battery packs to be compared. Accordingly, the ECU 23a calculates the voltage difference between battery packs 22 in each of the three or more combinations, and determines whether each voltage difference matches the reference.

If the ECU 23a determines that the voltage difference between the two compared battery packs 22 matches the reference (YES at S3), the ECU 23a determines the compared combination of battery packs 22 (two battery packs 22) as being battery packs to be connected in parallel (S4). That is, if there are three or more combinations of battery packs to be compared, if the ECU 23a determines that the voltage difference between each combination matches the reference, the ECU 23a determines all the three or more battery packs 22 as being battery packs to be connected in parallel (S4).

On the contrary, if the ECU 23a determines that the voltage difference between the two compared battery packs 22 does not match the reference (NO at S3), the ECU 23a determines whether any of the other compared combination(s) of two battery packs 22 has a voltage difference matching the reference (S5). If the other compared combination(s) of two battery packs 22 have/has a voltage difference matching the reference (YES at S5), the ECU 23a determines the battery packs 22 in the combination(s) having a voltage difference matching the reference as being battery packs to be connected in parallel (S4).

If none of the other compared combination(s) of two battery packs 22 have a voltage difference matching the reference (NO at S5), the ECU 23a determines to use, as a source of electricity, one of the two compared battery packs 22 that has a higher voltage (S6). Specifically, if the voltage difference between the compared battery packs 22 is greater than the reference (in cases where the reference is a range with the upper threshold the lower threshold, if the voltage difference is greater than the upper threshold), the ECU 23a determines that the voltage difference between the battery packs 22 is too large and determines to connect one of the battery packs 22 that has the highest voltage to the electric device 20 (S6).

Note that, in a case that there are three or more combinations, if the voltage difference between each combination does not match the reference, the ECU 23a determines to use, as a source of electricity, one of the three or more battery packs 22 that has the highest voltage (S6). Upon the determination, the ECU 23a causes the monitor 142 in the cabin 14 to display an indication that "charging is required" to provide a notification requesting the user to charge batteries (S7, END).

As described earlier, the number of battery packs 22 is two in the present example embodiment. Therefore, if the voltage difference between the two battery packs 22 matches the reference (YES at S3), the ECU 23a determines the two battery packs 22 as being battery packs to be connected in parallel (S4). On the contrary, if the voltage difference between the two battery packs 22 does not match the reference (NO at S3), the ECU 23a determines that the battery packs 22 in any combination cannot be connected in parallel (NO at S5), and determines to use, as a source of electricity, one of the two compared battery packs 22 that has a higher voltage (S6). Upon the determination, the ECU 23a causes the monitor 142 in the cabin 14 to display an indication that "charging is required" to provide a notification requesting the user to charge the batteries (S7, END).

In the above-described manner, the ECU 23a examines whether the battery packs 22 can be connected in parallel. If the ECU 23a determines that one or more combinations of battery packs 22 can be connected in parallel, the ECU 23a performs a process to connect the battery packs 22 in parallel (parallel connection process). If the ECU 23a determines that any combination of battery packs 22 cannot be connected in parallel, the ECU 23a performs a process to connect a single battery pack 22 (single connection process).

Figure 5:
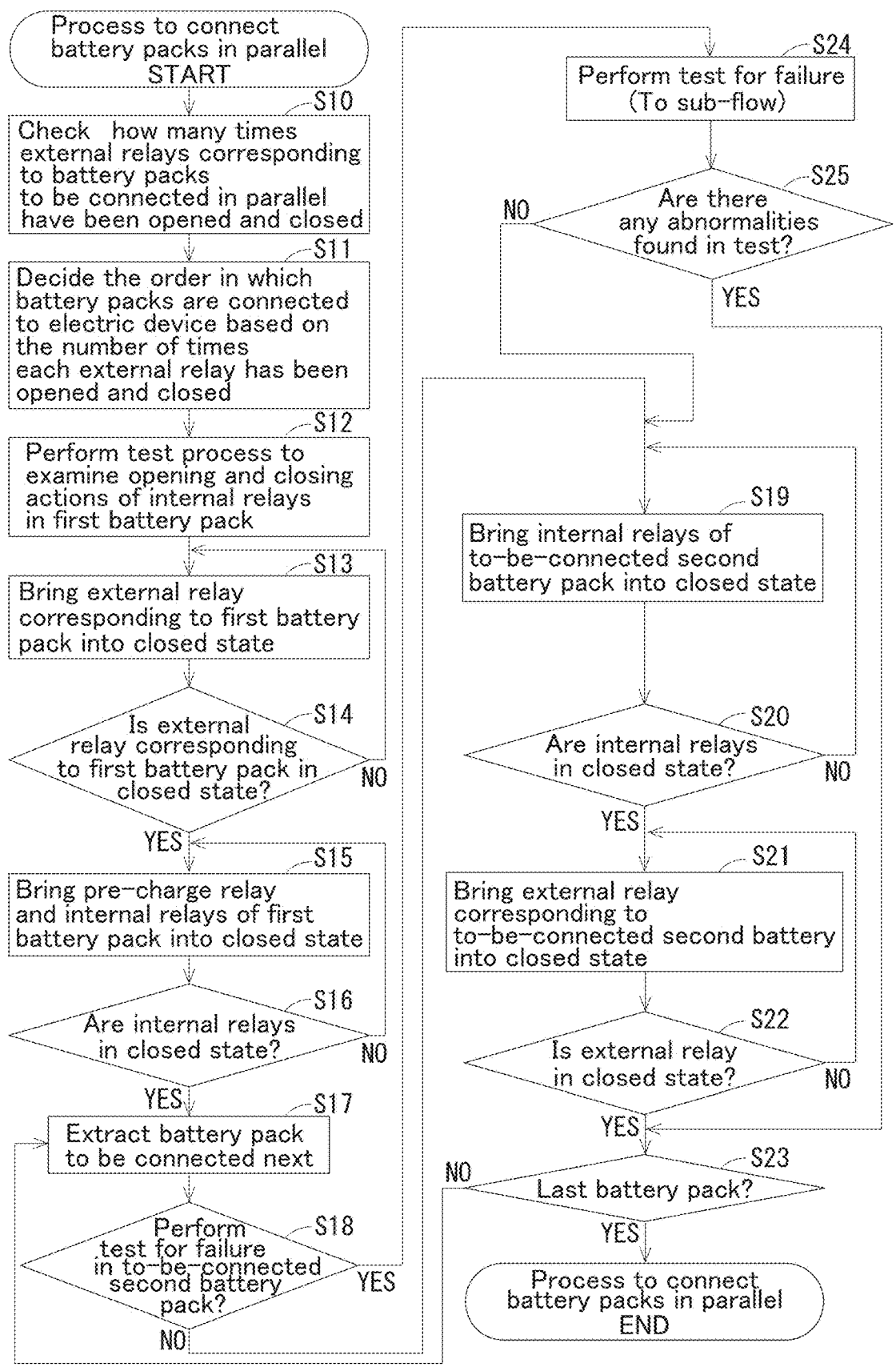
FIG. 5 is a flowchart of a parallel connection process to connect battery packs in parallel in an electric working machine according to an example embodiment of the present invention.

In the case where the ECU 23a performs the process to connect the battery packs 22 in parallel, as shown in FIG. 5, the ECU 23a checks how many times the external relays 211 corresponding to the battery packs 22 to be connected in parallel have been opened and closed (S10). Specifically, the ECU 23a stores the total number of times the external relay 211 corresponding to each battery pack 22 has been opened and closed, and checks the current total number when activated (S10). The ECU 23a then decides the order in which the battery packs 22 are connected to the electric circuitry 21 based on the number of times each external relay 211 has been opened and closed (S11). In the present example embodiment, the ECU 23a numbers the battery packs 22 in a descending order in terms of the number of times the corresponding external relay 211 has been opened and closed. Specifically, when deciding the order in which the battery packs 22 are to be connected to the electric circuitry 21 (S11), the ECU 23a assigns lower numbers to battery packs 22 connected to (corresponding to) external relays 211 having been opened and closed more often (in an ascending order starting with one).

In the present example embodiment, the external relay 211 corresponding to the first battery pack 22 is not subjected to (not or little subjected to) damage caused by inrush current resulting from opening/closing. On the contrary, the external relay(s) 211 corresponding to the second battery pack(s) 22 are damaged by inrush current resulting from opening/closing and the damage is accumulated as the number of times the external relay 211 has been opened and closed increases. This will be detailed later.

Thus, when the order of connection is decided such that the battery pack 22 in connection with (corresponding to) the most damaged external relay 211 (most frequently opened and closed external relay 211) is to be connected first to the electric circuitry 21, the effect (damage) of inrush current on the greatly damaged external relay 211 (the external relay 211 in which damage is accumulated) is reduced, thus equalizing the damage to the external relays 211. Note that the first battery pack 22 is selected based on the number of times the external relays 211 have been opened and closed in the present example embodiment. Alternatively, the controller 23 may be configured or programmed to use different battery packs 22 as the first battery pack 22 in turn by changing the first battery pack 22 every time the controller 23 performs activation (every time the controller 23 performs the process to connect the battery packs 22 to the electric device 20), irrespective of the number of times the external relays 211 have been opened and closed. This also make it possible to equalize the damage to the external relays 211.

The electric working machine 1 according to the present example embodiment includes only two battery packs 22. Therefore, at the first activation, one of the two battery packs 22 is a battery pack to be connected first to the electric circuitry 21 (first battery pack), whereas the other of the two battery packs 22 is a second battery pack to be connected second or later to the electric circuitry 21 (in the present example embodiment, a second battery pack to be connected second). At the second and later activations, the battery packs 22 are alternately used as the first battery pack (used as the battery pack that is to be connected first to the electric circuitry 21).

After the first battery pack 22 is selected as described above, the ECU 23a performs a connecting process to connect the first battery pack (battery pack) 22 to the electric device 20. In the connecting process, the ECU 23a performs a test process to examine the opening and closing actions of the internal relays 220 of the battery pack(s) 22 if the battery pack(s) 22 is specified as being battery pack(s) requiring the test process to examine the opening and closing actions of the internal relays 220, whereas the ECU 23a does not perform the test process if the battery pack(s) 22 is specified as battery pack(s) not requiring the test process to examine the opening and closing actions of the internal relays 220. In the present example embodiment, after the first battery pack 22 is selected, the ECU 23a performs the test process to examine the opening and closing actions of the internal relays 220 of the first battery pack 22 (S12). Specifically, it is determined (specified) in the ECU 23a (controller 23) that the first battery pack 22, which is one of the battery packs 22 that is to be connected first to the electric device 20, is a battery pack to undergo the test process to examine the opening and closing actions of the internal relays 220. Furthermore, the ECU 23a (controller 23) is configured or programmed to specify whether the test process to examine the opening and closing actions of the internal relays 220 of the second battery pack(s) 22, which is/are one or more of the battery packs 22 that is/are to be connected second or later to the electric device 20, is required or not. In the present example embodiment, the ECU 23a (controller 23) determines (specifies) that the test process to examine the opening and closing actions of the internal relays 220 of the second battery pack(s) 22 is not required (to be skipped).

Accordingly, upon selecting the first battery pack 22, the ECU 23a performs the test process to examine the opening and closing actions of the internal relays 220 as described above (S12).

The ECU 23a (controller 23), in the test process to examine the opening and closing actions of the internal relays 220, determines whether the internal relays 220 can operate, based on the open/closed states of the internal relays 220 and based on changes in the manner in which voltage is outputted from the first battery pack 22 when the internal relays 220 are brought into the open or closed state.

In the present example embodiment, each battery pack 22 includes relay switches including not only the internal relays 220 but also the pre-charge relay 224b and the discharge relay 225b, and therefore the ECU 23a, in the test process to examine the opening and closing actions of the relay switches, checks each relay switch for failure based on the open/closed states of the internal relays 220 (first internal relay 220a, second internal relay 220b), the pre-charge relay 224b, and the discharge relay 225b in the battery pack 22 and based on changes (whether there are changes or not) in voltage outputted from the battery pack 22 when the relay switches are brought into the open or closed state.

That is, the ECU 23a, in the test process to examine the internal relays 220, based on the assumption that the relay switches in the battery pack 22 are "form A" switches, identifies relay switch(es) undergoing failure (fusing, locking) (the internal relays 220 (first internal relay 220a, the second internal relay 220b) and/or the pre-charge relay 224b undergoing failure) based on the combination of the opening/closed states of the relay switches in the battery pack 22 and based on the manner in which voltage is outputted from the battery pack 22 that corresponds to the open/closed states of the relay switches (based on the combination of the open/closed states).

Specifically, the external relay 211, the internal relays 220 (first internal relay 220a, second internal relay 220b), the pre-charge relay 224b, and the discharge relay 225b are "form A" switches, and therefore are normally in the open state. In the test process to examine the opening and closing actions of the internal relays 220 etc., the ECU 23a issues instructions to the external relay 211, the internal relays 220 (first internal relay 220a, second internal relay 220b), the pre-charge relay 224b, and the discharge relay 225b to enter the open state or the closed state.

Based on the instructions from the ECU 23a, the BMS 23b causes the external relay 211, the internal relays 220 (first internal relay 220a, second internal relay 220b), the pre-charge relay 224b, and the discharge relay 225b to enter the open state or the closed state. Note, however, that the instructions from the ECU 23a and the BMS 23b following the instructions are not described here, and the description below is based simply on the open/closed states of the external relay 211, the internal relays 220 (first internal relay 220a, second internal relay 220b), the pre-charge relay 224b, and the discharge relay 225b.

As shown in FIG. 6, first, the external relay 211 is brought into the closed state and the first internal relay 220a, the second internal relay 220b, the pre-charge relay 224b, and the discharge relay 225b are brought into the open state. Under such conditions, if the battery pack 22 outputs voltage (if the voltage outputted from the battery pack 22 increases), the ECU 23a determines that the first internal relay 220a, the second internal relay 220b, and/or the pre-charge relay 224b is locked in the closed state (first test).

Next, the second internal relay 220b is brought into the closed state. Under such conditions, if the battery pack 22 outputs voltage (if the voltage outputted from the battery pack 22 increases), the ECU 23a determines that the first internal relay 220a and/or the pre-charge relay 224b is locked in the closed state (second test).

Next, the second internal relay 220b is brought into the open state, and the pre-charge relay 224b is brought into the closed state. Under such conditions, if the battery pack 22 outputs voltage (if the voltage outputted from the battery pack 22 increases), the ECU 23a determines that the second internal relay 220b is locked in the closed state (third test).

Next, the second internal relay 220b is brought into the closed state and then the first internal relay 220a is brought into the closed state. Once the second internal relay 220b has been brought into the closed state, the voltage outputted from the battery pack 22 increases. If such increased voltage (reference voltage) outputted from the battery pack 22 does not increase (voltage does not rise) when the first internal relay 220a is brought into the closed state, the ECU 23a determines that the second internal relay 220b or the pre-charge relay 224b is locked in the open state or the discharge relay 225b is locked in the closed state (fourth test).

Next, the pre-charge relay 224b is brought into the open state. Under such conditions, if the voltage outputted from the battery pack 22 does not increase (does not change) from the output voltage used as the reference voltage in the fourth test, the ECU 23a determines that the first internal relay 220a is locked in the open state (fifth test).

Next, the first internal relay 220a is brought into the open state and then the discharge relay 225b is brought into the closed state. Under such conditions, if the voltage outputted from the battery pack 22 does not decrease from the output voltage used as the reference voltage in the fourth test, the ECU 23a determines that the first internal relay 220a or the second internal relay 220b is locked in the closed state or the discharge relay 225b is locked in the open state (sixth test).

Next, the second internal relay 220b and the discharge relay 225b are brought into the open state. If the voltage outputted from the battery pack 22 here does not decrease, the ECU 23a determines that the discharge relay 225b is locked in the open state or the discharge resistor 225a has melted through or that the first internal relay 220a or the second internal relay 220b is locked in the closed state (seventh test).

Thus, the test process to examine the opening and closing actions of the relay switches (internal relays 220) makes it possible to examine (determine) whether there is an abnormality in the relay switches 220, 224b, 225b (internal circuit 222) based on the manner in which the voltage is outputted from the battery pack 22 (changes in the voltage) that would result from abnormalities in any of the relay switches (the internal relays 220 (first internal relay 220a, second internal relay 220b), the pre-charge relay 224b, and the discharge relay 225b) in the battery pack 22.

The test process to examine the opening and closing actions according to the present example embodiment is configured to find abnormalities in the relay switches based on the combinations of the open/closed states of the relay switches (the internal relays 220 (first internal relay 220a, second internal relay 220b), the pre-charge relay 224b, and the discharge relay 225b) in the battery pack 22 and based on the manners in which the voltage is outputted from the battery pack 22 for the combinations. The process therefore makes it possible to identify one or more of the relay switches that have an abnormality.

When the test process to examine the opening and closing actions of the relay switches (the internal relays 220 (first internal relay 220a, second internal relay 220b), the pre-charge relay 224b, and the discharge relay 225b) in the first battery pack 22 is performed as described above and it is determined that one or more of the relay switches (the internal relays 220 (first internal relay 220a, second internal relay 220b), the pre-charge relay 224b, and the discharge relay 225b) have an abnormality, the driving mode (activation process) is stopped or a connecting process (single connection process, see FIG. 8) to connect a single battery pack 22 (second battery pack 22) is performed. It is noted here that the driving mode (activation process) is stopped, and also that the notifier (monitor) 142 is caused to display an indication that the battery pack 22 has an abnormality to provide a notification to the user.

Returning to FIG. 5, when the ECU 23a performs the test process to examine the opening and closing actions of the relay switches (the internal relays 220 (first internal relay 220a, second internal relay 220b), the pre-charge relay 224b, and the discharge relay 225b) of the first battery pack 22 as described above and determines that the relay switches (the internal relays 220 (first internal relay 220a, second internal relay 220b), the pre-charge relay 224b, and the discharge relay 225b) have no abnormalities, the ECU 23a brings the external relay 211 corresponding to the first battery pack 22 from the open state to the closed state (first former process (second connecting process), S13). Specifically, the ECU 23a brings the external relay 211 in the primary circuit 210 connected to the first battery pack 22 from the open state to the closed state (first former process (second connecting process), S13). In the present example embodiment, the ECU 23a brings the external relay 211 in the negative primary circuit pathway 210b connected to the first battery pack 22 from the open state to the closed state (first former process (second connecting process), S13).

The ECU 23a waits until the external relay 211 of the primary circuit 210 (negative primary circuit pathway 210b) connected to the first battery pack 22 enters the closed state (S14). Once the external relay 211 of the primary circuit 210 (negative primary circuit pathway 210b) has entered the closed state (YES at S14), the ECU 23a issues an instruction to bring the pre-charge relay 224b of the first battery pack 22 from the open state to the closed state (S15, second former process). In bringing the pre-charge relay 224b into the closed state, the ECU 23a also issues an instruction to bring the internal relays 220 of the first battery pack 22 into the closed state (S15, third former process (first connecting process)). Accordingly, the BMS 23b corresponding to the battery pack 22, determined as being a battery pack to be connected first, brings the internal relays 220 and the pre-charge relay 224b into the closed state (S15, second former process, third former process).

In the present example embodiment, the internal relays 220 of each battery pack 22 include the first internal relay 220a and the second internal relay 220b, and the pre-charge circuit 224 is connected in parallel to the first internal relay 220a. Therefore, in bringing the internal relays 220 of the first battery pack 22 from the open state into the closed state, the BMS 23b brings the second internal relay 220b and the pre-charge relay 224b from the open state into the closed state (performs pre-charging using the pre-charge circuit 224) and then brings the first internal relay 220a connected in parallel to the pre-charge relay 224b from the open state into the closed state (S15, third former process). That is, when the first internal relay 220a connected in parallel to the pre-charge circuit 224 enters the closed state last, the entire internal circuit 222 enters the closed state (conducting state), so that the first battery pack 22 is electrically connected to the electric circuitry 21 (electric device 20) (S15, third former process).

The inrush current (starting current) that is supposed to act on the first internal relay 220a upon the first internal relay 220a entering the closed state will pass through the pre-charge circuit 224 connected in parallel to the first internal relay 220a, and will be absorbed by the pre-charge resistor 224a in the pre-charge circuit 224. This makes it possible to prevent or reduce damage to the internal relays 220 (220a, 220b) of the first battery pack 22 from the inrush current.

The ECU 23a waits until the internal relays 220 (the first internal relay 220a and the second internal relay 220b) of the first battery pack 22 enter the closed state (S16). Note that, in a case that pre-charging using the pre-charge circuit 224 is performed, when the internal circuit 222 enters the closed state after the pre-charging is completed, the first internal relay 220a connected in parallel to the pre-charge relay 224b achieves the continuity of the internal circuit 222. Therefore, the pre-charge relay 224b is brought into the open state upon the first internal relay 220a entering the closed state (this is not shown in the flowchart in FIG. 5).

Once the entire internal circuit 222 of the first battery pack 22 has entered the conducting state (once the internal relays 220 (the first internal relay 220a and the second internal relay 220b have entered the closed state)) (YES at S16), the ECU 23a extracts the battery pack 22 that is to be connected next from the battery pack(s) 22 determined to be connected second or later (S17). In the present example embodiment, the ECU 23a extracts the other of the two battery packs 22 as the battery pack to be connected next.

After extracting the second battery pack 22 (S17), the ECU 23a issues an instruction to perform or not to perform the test for failure (external relay testing process, opening/closing-of-relay testing process) of the discharge relay 225b of the second battery pack 22 (the battery pack 22 which is to be connected second or later) and the corresponding external relay 211 of the electric circuitry 21. Specifically, if it is specified that the test for failure is to be performed (YES at S18), the ECU 23a performs the test for failure (S24), whereas, if it is specified that the test for failure is not to be performed (NO at S18), the ECU 23a does not perform the test for failure and proceeds to the next step (S19).

In the present example embodiment, with regard to the test process to examine the opening and closing actions of the internal relays 220 of the battery packs 22, it is specified that the test process is to be performed on the first battery pack 22 and to be skipped (not to be performed) on the second battery pack(s) 22, as described earlier. Therefore, the ECU 23a does not determine whether the test process to examine the opening and closing actions of the internal relays 220 is required or not (to be performed or not) on the second battery pack(s) 22. Note that, although the test process to examine the opening and closing actions of the internal relays 220 of the battery packs 22 not only includes examining the opening and closing actions of the internal relays 220 (first internal relay 220a, second internal relay 220b) but also includes examining the opening and closing actions of the discharge relay 225b, the test for failure here (opening/closing-of-relay testing process) only includes examining the discharge relay 225b.

A specification of whether the test for failure of the discharge relay 225b and the external relay 211 is required or not (to be performed or not) is determined in advance and stored in the storing unit of the ECU 23a. The ECU 23a follows the specification stored in the storing unit.

Figure 7:
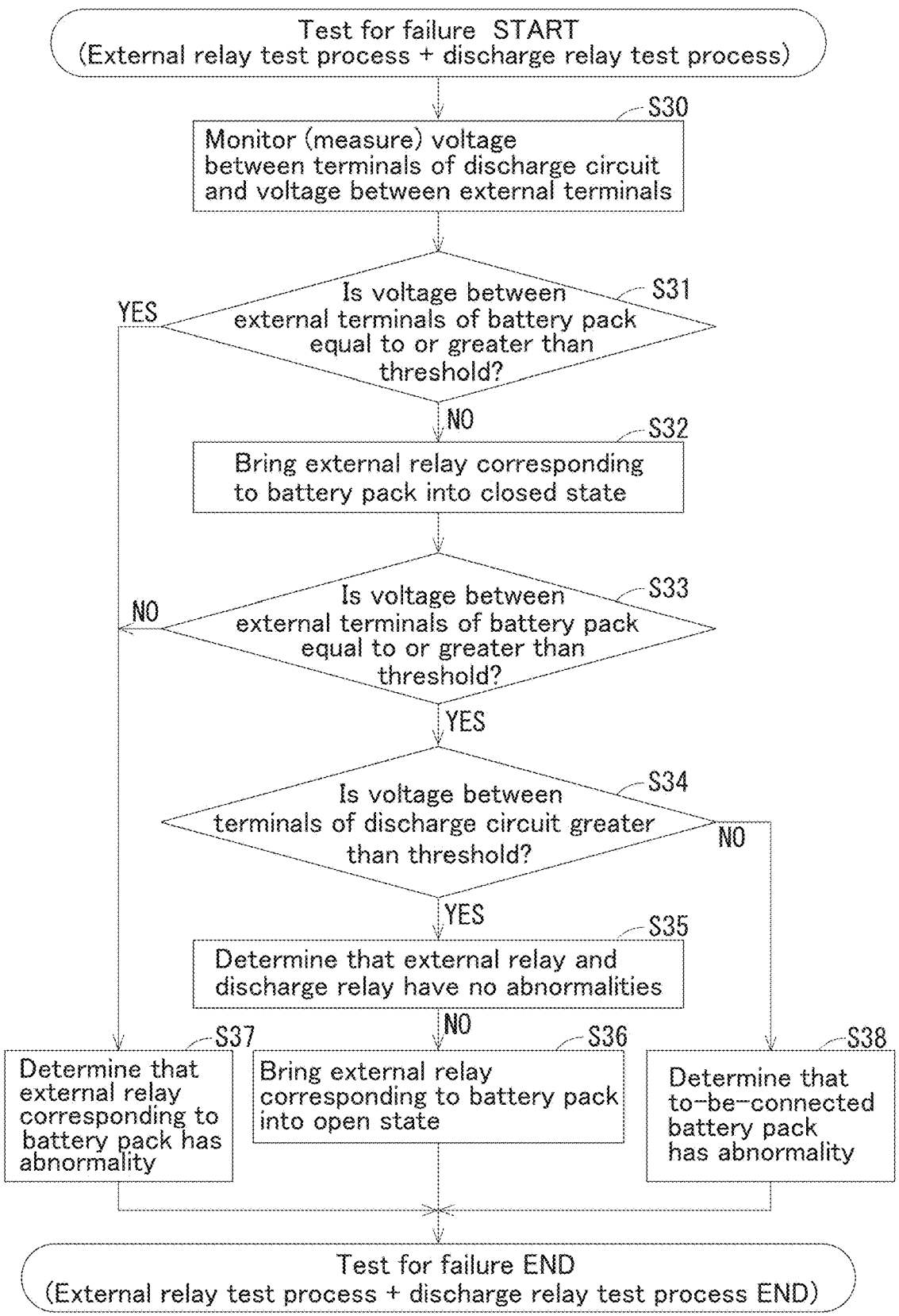
FIG. 7 is a flowchart of a test for failure in an electric working machine according to an example embodiment of the present invention.

In the present example embodiment, the specification indicates performing the test for failure (external relay testing process, opening/closing-of-relay testing process). Accordingly, the ECU 23a performs the test for failure (external relay testing process, opening/closing-of-relay testing process) (YES at S18, S24). As shown in FIG. 7, in performing the test for failure (external relay testing process, opening/closing-of-relay testing process), the ECU 23a first monitors (measures) the voltage between the external terminals (positive output terminal 223a, negative output terminal 223b) of the second battery pack 22 and the voltage of the discharge circuit 225 (voltage across the discharge circuit 225) (S30). Note that, since the discharge circuit 225 is located inside the battery pack 22, the BMS 23b monitors (measures) the voltage of the discharge circuit 225 (voltage across the discharge circuit 225) and transmits the monitored result (measured result) to the ECU 23a.

With this, the ECU 23a determines whether there is a voltage between the external terminals (positive output terminal 223a, negative output terminal 223b) of the battery pack 22 (S31), and, if the voltage between the external terminals (positive output terminal 223a, negative output terminal 223b) is equal to or more than a threshold (YES at S31), the ECU 23a determines that the external relay 211 in the corresponding primary circuit 210 is in the connected state (locked and connected because of fusion) and determines that there is an abnormality in the external relay 211 in the electrical system of the battery pack 22 which is a battery pack to be connected (S37). On the contrary, if the voltage between the external terminals (positive output terminal 223a, negative output terminal 223b) is less than the threshold (NO at S31), the ECU 23a brings the external relay 211 in the primary circuit 210 from the open state to the closed state (S32). Note that the threshold used in the determination is set to the source voltage provided in the specifications of the battery pack 22.

Under such conditions, the ECU 23a determines whether there is a voltage between the external terminals (positive output terminal 223a, negative output terminal 223b) and whether there is a voltage across the discharge circuit 225 (S33, S34). After that, if the voltage between the external terminals (positive output terminal 223a, negative output terminal 223b) is not equal to or more than the threshold (NO at S33), the ECU 23a determines that the external relay 211 in the primary circuit 210 has a failure (having not entered from the open state to the closed state) (S37).

On the contrary, if the voltage between the external terminals (positive output terminal 223a, negative output terminal 223b) is equal to or more than the threshold (YES at S33), it is presumed that the external relay 211 in the primary circuit 210 has properly changed from the open state to the closed state, and therefore the ECU 23a determines whether there is a voltage across the discharge circuit 225 (S34). It is noted here that the voltage across the discharge circuit 225 indicates the voltage across the discharge relay 225b (voltage between the opposite ends of the discharge relay 225b).

If there is a voltage across the discharge circuit 225 and the voltage is equal or less than a threshold (NO at S34), the ECU 23a determines that the discharge relay 225b has a failure (not in the open state) (S38). On the contrary, if the voltage across the discharge circuit 225 is more than the threshold (YES at S34), the ECU 23a determines that the discharge relay 225b in the discharge circuit 225 is in the open state and that the battery pack 22 to be connected and its electrical system (the discharge relay 225b and the external relay 211) have no abnormalities (are normal) (S35).

It is noted here that the reason why the voltage across the discharge circuit 225 is greater (higher) when the discharge relay 225b is in the open state than when the discharge relay 225b is in the closed state is that the manner in which the potentials occur at the opposite ends of the discharge relay 225b varies depending on whether the discharge relay 225b is in the open or closed state. Specifically, when the discharge relay 225b is in the closed state, electric current flows from the positive side to the negative side, so that there is no difference (potential difference) between the potential at the positive end and the potential at the negative end (the potential difference is zero). On the contrary, when the discharge relay 225b is in the open state, the potential at the positive end is not zero but the potential at the negative end is the ground potential, i.e., the potential at the negative end is zero.

With this, the potential at the positive end and the potential at the negative end of (potentials at the opposite ends of) the discharge relay 225b have a difference (potential difference). Thus, the voltage (potential difference) across the discharge circuit 225 is greater (higher) when the discharge relay 225b is in the open state than when the discharge relay 225b is in the closed state.

Then, if the ECU 23a determines that the discharge relay 225b is operating normal (S35), the ECU 23a brings the external relay 211 back into the open state (S36), and the test ends (END).

Returning to FIG. 5, if the ECU 23a determines that the second battery pack 22 and/or the external relay 211 have an abnormality via the test for failure (YES at S25), the ECU 23a determines whether there are other second battery pack(s) 22 left (S23). If there are no other second battery packs 22 left (YES at S23), the ECU 23a does not connect the second battery pack 22 which has been determined as having an abnormality (does not connect the next battery pack 22), and the battery pack parallel connection process ends (END). That is, the ECU 23a issues an instruction to supply electricity only using the first battery pack 22. On the contrary, if there is/are other second battery pack(s) 22 left (YES at S23), the ECU 23a extracts (selects) the battery pack 22 that is to be connected next from the other second battery pack(s) 22 (S17), and determines whether the test for failure is required, etc., similarly to the preceding second battery pack 22 (S18 to S25).

If the ECU 23a determines that the second battery pack 22 and the external relay 211 have no abnormalities (are normal) (NO at S25), the ECU 23a performs the connecting process to connect the second battery pack (battery pack) to the electric device 20. In performing the connecting process, similarly to the case of the first battery pack 22, the ECU 23a performs the test process to examine the opening and closing actions of the internal relays 220 on the battery pack(s) 22 which is/are specified as being battery pack(s) requiring the test process, and does not perform the test process on the battery pack(s) 22 which is/are specified as being battery pack(s) not requiring the test process. In the present example embodiment, the second battery pack (battery pack) is specified as being a battery pack not requiring the test process to examine the opening and closing actions of the internal relays 220, and therefore the test process is not performed on the second battery pack 22.

Specifically, in the present example embodiment, the ECU 23a, based on the instructions stored in the storing unit, issues an instruction indicating that the test to examine the opening and closing actions of the internal relays 220 of the second battery pack 22 is not required, that pre-charging using the pre-charge circuit 224 is not required, and that the internal relays 220 of the to-be-connected battery pack 22 are to be brought from the open state into the closed state (S19, first latter process (first connecting process)). That is, the ECU 23a issues an instruction to, with regard to the second battery pack 22, differently from when connecting the first battery pack 22, bring the internal relays 220 from the open state to the closed state without using the pre-charge circuit 224 (S19, first latter process (first connecting process)). Accordingly, the BMS 23b brings the internal relays 220 from the open state to the closed state (S19, first latter process (first connecting process)).

In the present example embodiment, the ECU 23a, based on the instructions stored in the storing unit, brings the first internal relay 220a and the second internal relay 220b concurrently into the closed state (S19, first latter process). Specifically, the internal relays 220 of the battery pack 22 include the first internal relay 220a and the second internal relay 220b. The ECU 23a, based on the instructions stored in the storing unit, issues an instruction to, with regard to the second battery pack 22, concurrently brings the first internal relay 220a and the second internal relay 220b from the open state into the closed state without prioritizing the first internal relay 220a or the second internal relay 220b (S19, first latter process (first connecting process)). Accordingly, the BMS 23b brings the first internal relay 220a and the second internal relay 220b concurrently from the open state into the closed state (S19, first latter process (first connecting process)).

The ECU 23a waits until the internal relays 220 (first internal relay 220a, second internal relay 220b) enter the closed state from the open state (S20), and, upon the internal relays 220 (first internal relay 220a, second internal relay 220b) entering the closed state from the open state (YES at S20), the ECU 23a brings the external relay 211 corresponding to the second battery pack 22 (the external relay 211 in the primary circuit 210 connected to the battery pack 22) from the open state into the closed state (S21, second latter process (second connecting process)).

Next, upon the external relay 211 corresponding to the second battery pack 22 entering the closed state (YES at S22), the ECU 23a determines whether there are any subsequent battery packs 22 (second battery pack(s) 22 that is/are to be connected but not yet connected) (S23). If the ECU 23a determines that there is/are subsequent battery pack(s) 22 (NO at S23), the ECU 23a extracts the next battery pack 22 and repeats the above-described steps (S17 to S23).

On the contrary, if the ECU 23a determines that there are no subsequent battery packs 22 (YES at S23), all the battery packs 22 determined as being battery packs to be connected in parallel are now connected to the electric circuitry 21 to supply electricity to the electric device 20.

It is noted here that, with regard to the second battery pack 22, the internal relays 220 are brought from the open state into the closed state and then the external relay 211 in the corresponding primary circuit 210 is brought from the open state into the closed state, and therefore, due to starting current and a flow of electric current resulting from the voltage difference between the second battery pack 22 and the previously connected battery pack 22, inrush current acts on the external relay 211, but damage to the internal relays 220 of the battery pack 22 can be avoided. Furthermore, since the external relay 211 housed in the junction box 24 such that the junction box 24 is replaceable, differently from the internal relays 220 of the battery pack 22, is damaged by the inrush current, the external relay 211 can be easily replaced with another undamaged one even if damaged.

Figure 8:
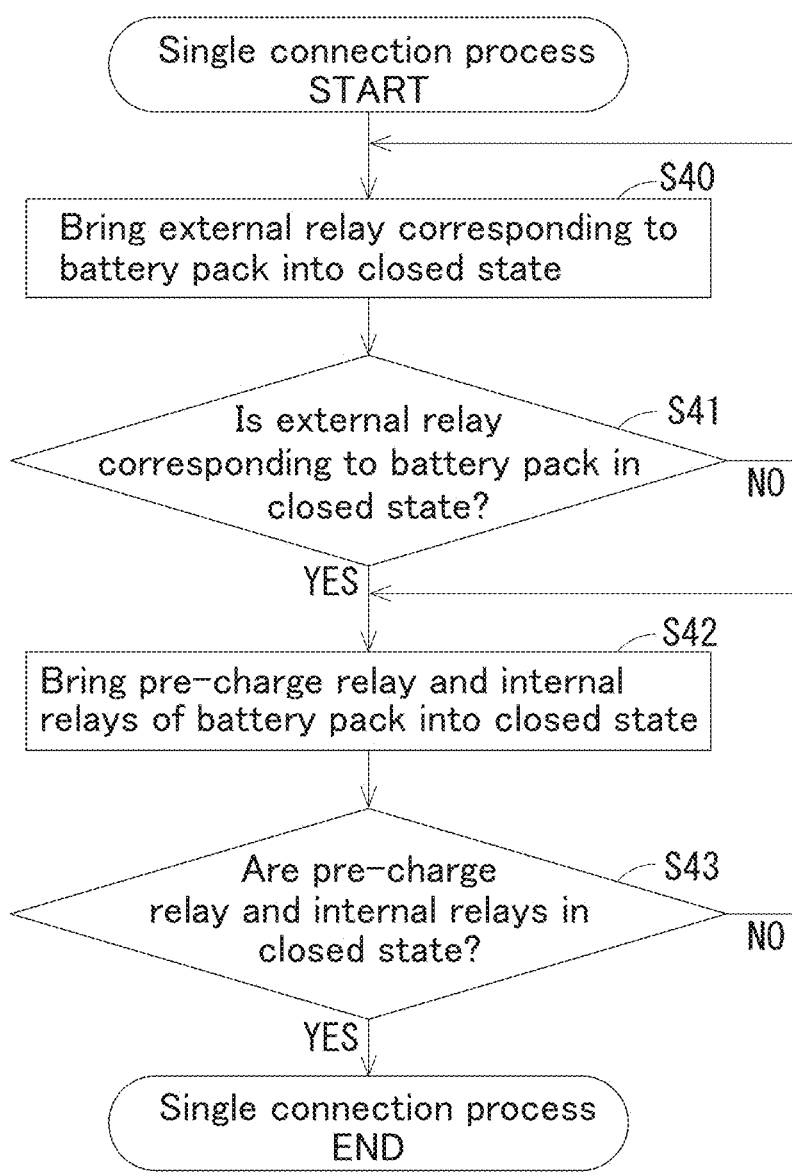
FIG. 8 is a flowchart of a single connection process to connect a single battery pack in an electric working machine according to an example embodiment of the present invention.

The parallel connection process to connect a plurality of battery packs 22 in parallel is as described above. In the whether-to-make-parallel-connection test, if the ECU 23a determines not to connect a plurality of battery packs 22 in parallel (determines a battery pack 22 high in charge as being a source of electricity), the ECU 23a performs the single connection process to connect a single battery pack 22. Specifically, as shown in FIG. 8, the ECU 23a brings the external relay 211 in the primary circuit 210 (210b) connected to the first battery pack 22 from the open state into the closed state (S40). Specifically, the ECU 23a brings the external relay 211 in the negative primary circuit pathway 210b connected to the first battery pack 22 from the open state into the closed state.

The ECU 23a waits until the external relay 211 in the primary circuit 210 (negative primary circuit pathway 210b) connected to the first battery pack 22 enters the closed state (S41), and, upon the external relay 211 in the primary circuit 210 (negative primary circuit pathway 210b) entering the closed state (YES at S41), the ECU 23a issues an instruction to bring the pre-charge relay 224b and the internal relays 220 of the first battery pack 22 into the closed state (S42). Accordingly, the BMS 23b, corresponding to the battery pack 22 which has been determined to be connected first, brings the pre-charge relay 224b and the internal relays 220 into the closed state (S42).

Specifically, the ECU 23a issues an instruction to bring the pre-charge relay 224b of the first battery pack 22 from the open state into the closed state (second former process). Also, the ECU 23a issues an instruction to bring the internal relays 220 of the first battery pack 22 into the closed state (third former process). Accordingly, the BMS 23b corresponding to the first battery pack 22 brings the internal relays 220 and the pre-charge relay 224b into the closed state (second former process, third former process).

In the present example embodiment, the internal relays 220 of each battery pack 22 include the first internal relay 220a and the second internal relay 220b, and the pre-charge circuit 224 is connected in parallel to the first internal relay 220a. Therefore, in bringing the internal relays 220 of the first battery pack 22 from the open state into the closed state, the BMS 23b brings the second internal relay 220b and the pre-charge relay 224b from the open state into the closed state (completes pre-charging using the pre-charge circuit 224) and then brings the first internal relay 220a connected in parallel to the pre-charge relay 224b from the open state into the closed state (third former process).

Thus, when the first internal relay 220a connected in parallel to the pre-charge circuit 224 enters the closed state last, the entire internal circuit 222 enters the closed state (conducting state), so that the first battery pack 22 is electrically connected to the electric circuitry 21 (electric device 20) (third former process).

The inrush current (starting current) that is supposed to act on the first internal relay 220a upon the first internal relay 220a entering the closed state last will pass through the pre-charge circuit 224 connected in parallel to the first internal relay 220a, and will be absorbed by the pre-charge resistor 224a in the pre-charge circuit 224. This makes it possible to prevent or reduce damage on the internal relays 220 (220a, 220b) of the first battery pack 22 from the inrush current.

Next, the ECU 23a waits until the internal relays 220 (the first internal relay 220a and the second internal relay 220b)

of the first battery pack 22 enter the closed state (S43). Once the internal relays 220 (the first internal relay 220a and the second internal relay 220b) of the first battery pack 22 have entered the closed state (YES at S43), the ECU 23a ends the single connection process to connect a single battery pack 22, so that the battery pack 22 with the highest voltage is connected to the electric device 20 to drive the electric device 20. Note that, once the battery pack 22 has been connected to the electric device 20, the ECU 23a issues an instruction to bring the pre-charge relay 224b of the pre-charge circuit 224 of the first battery pack 22 from the closed state into the open state (this is not shown in the flowchart in FIG. 8). Accordingly, the BMS 23b brings the pre-charge relay 224b of the pre-charge circuit 224 of the first battery pack 22 from the closed state into the open state.

In a case that, in the whether-to-make-parallel-connection test, a notification indicating that charging is required is provided and then the user is about to charge the battery pack(s) 22, a charging cable leading to a charger (for example, a fast charger) is connected to the charging inlet 25.

When the charging cable is connected to the charging inlet 25, the ECU 23a detects the connection and performs a charging mode in which the ECU 23a charges battery pack(s) 22.

Figure 9:
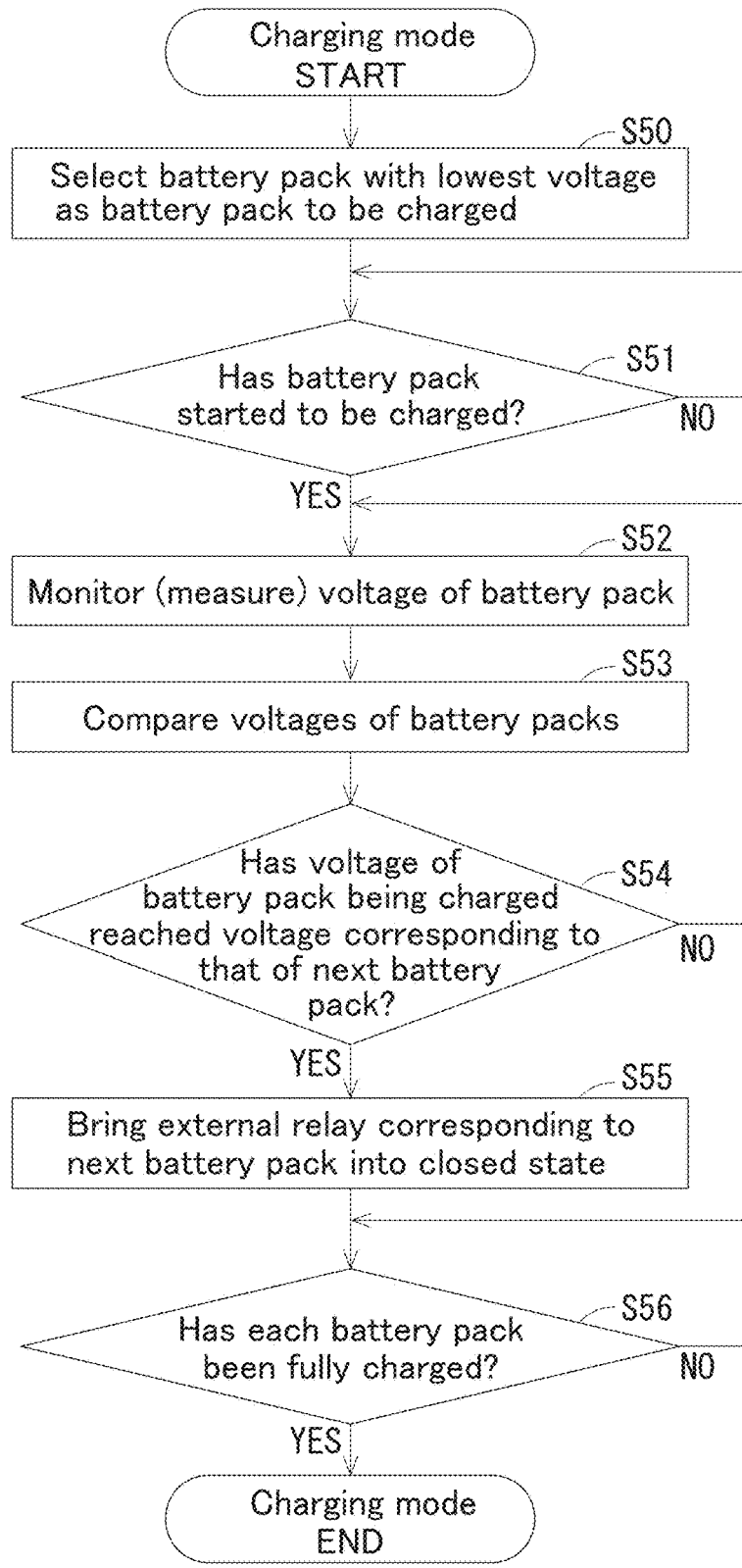
FIG. 9 is a flowchart of a charging mode in which battery packs are charged in an electric working machine according to an example embodiment of the present invention.

As shown in FIG. 9, in the charging mode, the ECU 23a determines the battery pack 22 with the lowest voltage as being a battery pack to be charged (S50). In the present example embodiment, the ECU 23a determines the battery pack 22 which was determined not to be connected to the electric circuitry 21 in the previous whether-to-make-parallel-connection test (the battery pack 22 with low voltage) as being a battery pack to be charged (S50). That is, the ECU 23a determines one or more of a plurality of battery packs 22 that are low in charge as being battery pack(s) to be charged.

Accordingly, the ECU 23a brings the external relay 211 in the primary circuit 210 (210b) connected to the to-be-charged battery pack 22 from the open state into the closed state, and keeps the external relay(s) 211 in the primary circuit(s) 210 (210b) connected to the battery pack(s) 22 not to be charged (battery pack(s) 22 high in charge) in the open state.

With this, the charging inlet 25 and the battery pack 22 low in charge are connected in electrical communication with each other such that the battery pack(s) 22 high in charge and the charging inlet 25 are electrically disconnected from each other.

Once the battery pack 22 with low voltage (the battery pack 22 low in charge) has started being charged (YES at S51), the ECU 23a measures the voltages of a plurality of battery packs (all the battery packs) 22 including the battery pack(s) 22 not to be charged (S52), and then the ECU 23a compares the voltages of the battery packs 22 with each other (S53). Specifically, the ECU 23a calculates the voltage difference between battery packs 22 in each combination (two battery packs 22) to be compared (S53). In the present example embodiment, the electric working machine 1 includes only two battery packs 22, and therefore there is only one combination to be compared. The ECU 23a therefore calculates the voltage difference between the two battery packs 22 (S53).

The ECU 23a compares the voltages of the battery packs 22, and determines whether the voltage of the battery pack 22 being charged has reached a voltage corresponding to the voltage of the battery packs 22 not to be charged (the battery packs 22 with high voltage), i.e., the ECU 23a determines whether the voltage difference between the battery pack 22 being charged and the battery pack 22 with high voltage is substantially zero (reference value) (S54). In the present example embodiment, based on the calculation of the voltage difference (comparison between voltages) in S53, if the voltage difference between the compared battery packs 22 is zero or substantially zero, the ECU 23a determines that the voltage of the battery pack 22 being charged has reached a voltage corresponding to the voltage of the battery pack 22 not to be charged (YES at S54).

If the ECU 23a determines that the voltage of the battery pack 22 being charged has reached a voltage corresponding to the voltage of the battery pack 22 not to be charged (YES at S54), the ECU 23a brings the external relay 211 in the primary circuit 210 connected to the battery pack 22 not to be charged (the battery pack 22 high in charge) from the open state to the closed state (S55). That is, the ECU 23a charges the battery packs 22 until the battery packs 22 are fully charged such that the voltages of the compared battery packs 22 are the same or substantially the same and that the compared battery packs 22 are connected in parallel to each other (S55).

With this, the battery packs 22 are each fully charged such that the voltage difference is kept at the reference (the voltage difference between the battery packs 22 is zero or small) (S56). Note that, in a case that the number of battery packs 22 is three or more, the battery packs 22 determined not to be charged are charged sequentially so that the voltages thereof are the same or substantially the same.

With this, at activation, the voltage difference between the battery packs 22 is zero or small, making it possible to eliminate or reduce damage to the external relay 211 that is brought into the closed state last when the battery packs 22 are connected in parallel. Furthermore, since the battery packs 22 are fully charged, it is possible to achieve long operation.

Note that, in the present example embodiment, when the electric working machine 1 is to be stopped, the activation switch is turned off, so that the ECU 23a brings the internal relays 220 of the battery packs 22 and the external relays 211 in the primary circuits 210 from the closed state into the open state to shut off the electrical system to stop the supply of electricity from the battery packs 22 to the electric device 20.

An electric working machine 1 according to one or more example embodiments has been described. One or more example embodiments include a plurality of subject matters that can be organized in subject matter groups. Specifically, example embodiments of the present invention provide electric working machines 1 described in each item below, and the electric working machine 1 in each item achieves specific effect(s).

(Item 1-1) An electric working machine 1 including an electric device 20, electric circuitry 21 electrically connected to the electric device 20, battery packs 22 to be connected sequentially to the electric device 20 via the electric circuitry 21 such that the battery packs 22 are connected in parallel, the battery packs 22 each including at least one internal relay 220 to open and close an internal circuit 222, and a controller 23, the electric circuitry 21 including external relays 211 corresponding to the respective battery packs 22 to open and close respective circuits connecting the respective corresponding battery packs 22 to the electric device 20, and the controller 23 is configured or programmed to perform a first latter process S19 in which, while a first battery pack 22 of the battery packs 22 that is to be connected first to the electric device 20 is in electrical connection with the electric device 20, the controller 23 brings the at least one internal relay 220 of a second battery pack 22 of the battery packs 22 that is to be connected second or later to the electric device 20 into a closed state, and a second latter process S21 in which the controller 23 brings, into the closed state, one of the external relays 211 that corresponds to the second battery pack 22 in which the at least one internal relay 220 is in the closed state.

With the electric working machine 1 of item 1-1, the electric circuitry 21 includes external relays 211 which correspond to respective battery packs 22 and which are operable to open and close respective circuits to connect the corresponding respective battery packs 22 to the electric device 20, and therefore, when the external relays 211 are brought into the closed state one after another, the battery packs 22 are connected to the electric device 20 (electric circuitry 21) one after another. When all the external relays 211 are in the closed state, the battery packs 22 are connected to the electric device 20 (electric circuitry 21) such that they are connected in parallel to each other.

Since each of the battery packs 22 includes at least one internal relay 220, when the internal relay 220 is in the open state, the internal circuit 222 is in the open state, whereas, when the internal relay 220 is in the closed state, the internal circuit 222 is also in the closed state. Therefore, when the internal relays 220 of the battery packs 22 are in the closed state and all the external relays 211 are in the closed state, the battery packs 22 electrically in parallel are electrically connected to the electric device 20. With this, the electrical load on each battery pack 22 lowers, making it possible to eliminate or reduce the likelihood that the electric working machine 1 will suffer power trouble (failure).

With the above configuration, the battery packs 22 are connected to the electric device 20 one after another. It is noted here that the first battery pack 22 is electrically connected to the electric device 20 when the at least one internal relay 220 is brought into the closed state and the external relay 211 corresponding to the first battery pack 22 is brought into the closed state.

Under such conditions, the controller 23 performs the first latter process (S19) to bring the at least one internal relay 220 of a second battery pack 22 to the closed state and performs the second latter process (S21) to bring the external relay 211 corresponding to the second battery pack 22 in which the internal relay 220 is in the closed state to the closed state, so that the battery pack 22 is connected to the electric device 20 without the internal relay 220 of the second battery pack 22 being subjected to inrush current.

That is, when the internal relay 220 of the battery pack 22 is brought into the closed state in the first latter process (S19) and then the external relay 211 is brought into the closed state in the second latter process (S21), the external relay 211 brought into the closed state last is subjected to inrush current. That is, the external relay 211 located outside the battery pack 22 is subjected to inrush current.

Thus, with the electric working machine 1 according to one or more example embodiments described above, even when a plurality of battery packs 22 are connected in parallel, it is possible to eliminate or reduce the likelihood that the battery packs 22 will suffer failure from inrush current resulting from the activation of the electric device 20.

(Item 1-2) The electric working machine 1 according to item 1-1, wherein in at least the first battery pack 22, the at least one internal relay 220 includes a first internal relay 220*a*, at least the first battery pack 22 includes a pre-charge circuit 224 which includes a series circuit including a pre-charge resistor 224*a* and a pre-charge relay 224*b* and which is connected in parallel to the first internal relay 220*a*, the controller 23 is configured or programmed to, in connecting the first battery pack 22 to the electric device 20, perform a first former process in which the controller 23 brings, into the closed state, one of the external relays 211 that corresponds to the first battery pack 22, perform a second former process in which the controller 23 brings the pre-charge relay 224*b* of the first battery pack 22 into the closed state, and perform a third former process in which the controller 23 brings the first internal relay 220*a* of the first battery pack 22 into the closed state after the first former process and the second former process.

With the electric working machine 1 according to item 1-2, in the first former process (S13), when the external relay 211 is brought into the closed state, the electric circuitry 21 is brought into the closed state (conducting state). In such conditions, since the internal circuit 222 of the battery pack 22 is in the open state, the external relay 211 is not subjected to inrush current. In the second former process (S15), when the pre-charge relay 224*b* of the pre-charge circuit 224 is brought to the closed state, the pre-charge circuit 224 forms a connection bypassing the internal relay 220.

Accordingly, when the first former process (S13) is performed before or after the second former process (S15) to bring the external relay 211 corresponding to the first battery pack 22 to the closed state, the internal circuit 222 of the battery pack 22 and the electric circuitry 21 are brought into the conducting state. With this, inrush current is caused by electricity supply from a single battery pack 22. However, since the pre-charge circuit 224 is in the closed state and a pre-charge is being performed (the pre-charge resistor 224*a* of the pre-charge circuit 224 is absorbing inrush current), damage to the internal circuit 222 and the electric circuitry 21 (external relay 211) are prevented or reduced.

Furthermore, in the third former process (S15), the internal relay 220 (first internal relay 220*a*) in parallel to the pre-charge circuit 224 in the first battery pack 22 is brought into the closed state, obtaining a circuit structure in which the pre-charge resistor 224*a* of the pre-charge circuit 224 is not subjected to a load (normal circuit structure when conducting).

(Item 1-3) The electric working machine 1 according to item 1-2, wherein each of the battery packs 22 includes at least one cell 221, in each of the battery packs 22, the at least one internal relay 220 includes the first internal relay 220*a* provided in a pathway 222*a* on one of opposite terminals of the at least one cell 221 such that the first internal relay 220*a* is parallel to the pre-charge circuit 224, and a second internal relay 220*b* provided in another path way 222*b* on the other of the opposite terminals of the at least one cell 221, and the controller 23 is configured or programmed to, in the second former process, keep the first internal relay 220*a* in an open state and bring the second internal relay 220*b* and the pre-charge relay 224*b* into the closed state.

With the electric working machine 1 according to item 1-3, in the second former process, when the second internal relay 220*b* and the pre-charge relay 224*b* are brought into the closed state, the internal circuit 222 enters the conducting state via the pre-charge circuit 224. However, the pre-charge circuit 224 includes the pre-charge resistor 224*a*, and the pre-charge resistor 224*a* is consuming electricity. With this, in the third former process (S15), even when the first internal relay 220*a* enters the closed state, the first internal relay 220*a* is subjected to no or little inrush current, preventing or reducing impact etc. on the first internal relay 220*a*.

(Item 1-4) The electric working machine 1 according to any one of items 1-1 to 1-3, further including a junction box 24 to house the electric circuitry 21 partially or entirely, wherein the external relays 211 are housed in the junction box 24 such that the external relays 211 are replaceable with other external relays.

With the electric working machine 1 according to item 1-4, even if the external relay 211 is broken, it is possible to easily regain the unbroken state by replacing the broken external relay 211 with another external relay 211.

(Item 1-5) The electric working machine 1 according to any one of items 1-1 to 1-4, further including a working device 11 to perform work, wherein the electric device 20 is operable to drive the working device 11 directly or indirectly.

With the electric working machine 1 according to item 1-5, the electric device 20 drives the working device 11 by receiving electricity from the battery pack(s) 22 in which the internal circuit 222 (such as the internal relay(s) 220) is not damaged. That is, the battery pack 22 is connected to the electric device 20 via the above-described activation process and therefore the internal relay 220 thereof is subjected to less damage during the activation process, eliminating or reducing the likelihood that power failure will occur when the electric device 20 drives the working device 11.

(Item 1-6) The electric working machine 1 according to any one of items 1-1 to 1-5, wherein the controller 23 is configured or programmed to select, as the first battery pack 22, one of the battery packs 22 that corresponds to one of the external relays 211 that has been opened and closed the largest number of times.

With the electric working machine 1 according to item 1-6, it is possible to equalize the damage to the external relays 211.

Specifically, the damage suffered by the external relay 211 differs depending on the number of opening and closing actions. That is, when the number of opening and closing actions of the external relay 211 increases, the damages it suffers from opening and closing the circuit increases accordingly. On the contrary, when the number of opening and closing actions decreases, the damage it suffers from opening and closing the circuit decreases. In one or more example embodiments described above, the external relay 211 corresponding to the first battery pack 22 to be connected to the electric device 20 is brought into the closed state first in the entire electrical system including the battery packs 22, and therefore is subjected to no (or little) inrush current. On the contrary, the external relay 211 corresponding to the second battery pack 22 to be connected to the electric device 20 is brought to the closed state last in the entire electrical system, and therefore is subjected to inrush current and greatly damaged. In particular, the external relay 211 corresponding to the battery pack 22 which has been used as a second battery pack 22 (determined as being a battery pack to be connected second or later) many times has accumulated damage.

In this regard, in one or more example embodiments described above, the battery pack 22 corresponding to the external relay 211 which has been opened and closed the largest number of times is connected first (determined as being a first battery pack 22), and therefore the damage to the greatly damaged external relay 211 is prevented or reduced. Furthermore, the first battery pack 22 to be connected to the electric device 20 (electric circuitry 21) is changed every time the electric device 20 is activated, so that the external relay 211 to be brought into the closed state first is also changed. This makes it possible to equalize the damage to the external relays 211. With this, it is possible to eliminate or reduce the likelihood that a specific external relay 211 will be broken.

(Item 1-7) The electric working machine 1 according to any one of items 1-1 to 1-5, wherein the controller 23 is configured or programmed to use different ones of the battery packs 22 as the first battery pack 22 in turn by changing the first battery pack 22 every time the controller 23 performs a process to connect the battery packs 22 to the electric device 20.

With the electric working machine 1 according to item 1-7, it is possible to equalize the damage to the external relays 211.

(Item 1-8) A method of activating an electric working machine 1, the electric working machine 1 including an electric device 20, electric circuitry 21 electrically connected to the electric device 20, and battery packs 22 to be connected sequentially to the electric device 20 via the electric circuitry 21 such that the battery packs 22 are connected in parallel, the battery packs 22 each including at least one internal relay 220 to open and close an internal circuit 222, the electric circuitry 21 including external relays 211 corresponding to the respective battery packs 22 to open and close respective circuits connecting the respective corresponding battery packs 22 to the electric device 20, the method including performing a first latter process in which, while a first battery pack 22 of the battery packs 22 that is to be connected first to the electric device 20 is in electrical connection with the electric device 20, the at least one internal relay 220 of a second battery pack 22 of the battery packs 22 that is to be connected second or later to the electric device 20 is brought into a closed state, and a second latter process in which one of the external relays 211 that corresponds to the second battery pack 22 in which the at least one internal relay 220 is in the closed state is brought into the closed state.

With the method of activating an electric working machine 1 according to item 1-8, the first latter process (S19) to bring the at least one internal relay 220 of a second battery pack 22 to the closed state is performed and the second latter process (S21) to bring the external relay 211 corresponding to the second battery pack 22 in which the internal relay 220 is in the closed state to the closed state is performed, so that the battery pack 22 is connected to the electric device 20 without the internal relay 220 of the battery pack 22 being subjected to inrush current.

That is, when the internal relay 220 of the battery pack 22 is brought into the closed state in the first latter process (S19) and then the external relay 211 is brought into the closed state in the second latter process (S21), the external relay 211 brought into the closed state last is subjected to inrush current. That is, the external relay 211 located outside the battery pack 22 is subjected to inrush current.

Thus, with the method of activating an electric working machine 1 according to item 1-8, even when a plurality of battery packs 22 are connected in parallel, it is possible to eliminate or reduce the likelihood that the battery packs 22 will suffer failure from inrush current resulting from the activation of the electric device 20.

(Item 2-1) An electric working machine 1 including an electric device 20, electric circuitry 21 electrically connected to the electric device 20, battery packs 22 to be connected sequentially to the electric device 20 via the electric circuitry 21 such that the battery packs 22 are connected in parallel, the battery packs 22 each including at least one internal relay 220 to open and close an internal circuit 222, and a controller 23, the electric circuitry 21 including external relays 211 corresponding to the respective battery packs 22 to open and close respective circuits connecting the respective corresponding battery packs 22 to the electric device 20, and the controller 23 is configured or programmed to specify each of the battery packs 22 as being a battery pack requiring a test process to examine opening and closing actions of the at least one internal relay 220 or a battery pack not requiring the test process, and in connecting the battery packs 22 to the electric device 20, perform the test process on one or more of the battery packs 22 that have been specified as requiring the test process to examine the opening and closing actions, and not perform the test process on one or more of the battery packs 22 that have been specified as not requiring the test process to examine the opening and closing actions.

With the electric working machine 1 according to item 2-1, the test process to examine the opening and closing actions is performed on battery pack(s) 22 specified as requiring the test process. This makes it possible to supply electricity to the electric device 20 with no internal troubles (such as troubles in the internal relay(s) 220) in the battery pack 22.

On the contrary, the test process to examine the opening and closing actions is not performed on battery pack(s) 22 specified as not requiring the test process. This makes it possible to reduce the time taken for the battery packs 22 to be connected to the electric device 20.

(Item 2-2) The electric working machine 1 according to item 2-1, wherein the controller 23 is configured or programmed to specify a first battery pack 22 as being a battery pack to undergo the test process, the first battery pack 22 being one of the battery packs 22 that is to be connected first to the electric device 20, and specify a second battery pack 22 as being a battery pack not to undergo the test process, the second battery pack 22 being one of the battery packs 22 that is to be connected second or later to the electric device 20.

With the electric working machine 1 according to item 2-1, the controller 23 specifies one or more of the battery packs 22 that are to be connected second or later as battery pack(s) 22 not to undergo the test process. Since the test process is skipped depending on the situation, it is possible to reduce the time taken for the battery packs 22 to be connected to the electric device 20.

(Item 2-3) The electric working machine 1 according to item 2-1 or 2-2, wherein the controller 23 is configured or programmed to examine the opening and closing actions of the at least one internal relay 220 based on an instruction to open or close the at least one internal relay 220 and based on a change in voltage outputted from the battery pack 22 that corresponds to the instruction to open or close the at least one internal relay 220.

With the electric working machine 1 according to item 2-3, it is also possible to not only determine whether internal relays 220 have a trouble but also determine which internal relay(s) 220 have a trouble.

(Item 2-4) The electric working machine 1 according to any one of items 2-1 to 2-3, wherein each of the battery packs 22 includes a pre-charge circuit 224, the pre-charge circuit 224 including a series circuit including a pre-charge resistor 224a and a pre-charge relay 224b and connected in parallel to the at least one internal relay 220, and the controller 23 is configured or programmed to specify each of the battery packs 22 as a battery pack requiring pre-charging in which the pre-charge relay 224b is brought into the closed state before the at least one internal relay 220 is brought into the closed state or as a battery pack not requiring the pre-charging, in connecting one or more of the battery packs 22 that have been specified as requiring the pre-charging to the electric device 20, perform the pre-charging and then perform a first connecting process (third former process) S15 to bring the at least one internal relay 220 of the one or more of the battery packs 22 into the closed state, and in connecting one or more of the battery packs 22 that have been specified as not requiring the pre-charging to the electric device 20, not perform the pre-charging and perform the first connecting process (first latter process) S19.

With the electric working machine 1 according to item 2-4, when a battery pack 22 specified as requiring pre-charging is connected to the electric device 20, the pre-charging is performed and then the first connecting process (third former process) S15 is performed. This makes it possible to connect the battery pack 22 to the electric device 20 with no internal troubles (e.g., troubles resulting from the effects of inrush current on the internal relays 220) in the battery pack 22.

On the contrary, when a battery pack 22 specified as not requiring pre-charging is connected to the electric device 20, the pre-charging is not performed (skipped). This makes it possible to reduce the time taken for the battery packs 22 to be connected to the electric device 20.

(Item 2-5) An electric working machine 1 including an electric device 20, electric circuitry 21 electrically connected to the electric device 20, battery packs 22 to be connected sequentially to the electric device 20 via the electric circuitry 21 such that the battery packs 22 are connected in parallel, the battery packs 22 each including at least one internal relay 220 to open and close an internal circuit 222, and a controller 23, the electric circuitry 21 including external relays 211 corresponding to the respective battery packs 22 to open and close respective circuits connecting the respective corresponding battery packs 22 to the electric device 20, each of the battery packs 22 includes a pre-charge circuit 224, the pre-charge circuit 224 including a series circuit including a pre-charge resistor 224a and a pre-charge relay 224b and connected in parallel to the at least one internal relay 220, and the controller 23 is configured or programmed to specify each of the battery packs 22 as a battery pack requiring pre-charging in which the pre-charge relay 224b is brought into the closed state before the at least one internal relay 220 is brought into the closed state or as a battery pack not requiring the pre-charging, in connecting one or more of the battery packs 22 that have been specified as being a battery pack requiring the pre-charging to the electric device 20, perform the pre-charging and then perform a first connecting process (third former process) S15 to bring the at least one internal relay 220 of the one or more of the battery packs 22 into the closed state, and in connecting one or more of the battery packs 22 that have been specified as a battery pack not requiring the pre-charging to the electric device 20, not perform the pre-charging and perform the first connecting process (first latter process) S19.

With the electric working machine 1 according to item 2-5, when a battery pack 22 specified as requiring pre-charging is connected to the electric device 20, the pre-charging is performed and then the first connecting process (third former process) S15 is performed. This makes it possible to connect the battery pack 22 to the electric device 20 with no internal troubles (e.g., troubles resulting from the effects of inrush current on the internal relays 220) in the battery pack 22.

On the contrary, when a battery pack 22 specified as not requiring pre-charging is connected to the electric device 20, the pre-charging is not performed (skipped). This makes it possible to reduce the time taken for the battery packs 22 to be connected to the electric device 20.

(Item 2-6) The electric working machine 1 according to item 2-4 or 2-5, wherein the at least one internal relay 220 of each of the battery packs 22 includes a first internal relay 220a on a positive side and a second internal relay 220b on a negative side, and the controller 23 is configured or programmed to specify whether to bring the first internal relay 220a and the second internal relay 220b concurrently into the closed state in the first connecting process (first latter process) S19, if the controller 23 has specified bringing the first internal relay 220a and the second internal relay 220b concurrently into the closed state, bring the first internal relay 220a and the second internal relay 220b concurrently into the closed state in the first connecting process (first latter process) S19.

With the electric working machine 1 according to item 2-6, even if a battery pack 22 includes a plurality of internal relays 220 (first internal relay 220a, second internal relay 220b), by specifying bringing the plurality of internal relays 220 concurrently to the closed state, it is possible to connect the battery pack 22 to the electric device 20 with reduced operation time of the internal relays 220.

(Item 2-7) The electric working machine 1 according to item 2-4 or 2-5, wherein the controller 23 is configured or programmed to specify a first battery pack 22 as being a battery pack to undergo the pre-charging, the first battery pack 22 being one of the battery packs 22 that is to be connected first to the electric device 20, and specify a second battery pack 22 as being a battery pack not to undergo the pre-charging, the second battery pack 22 being one of the battery packs 22 that is to be connected second or later to the electric device 20.

With the electric working machine 1 according to item 2-7, even if a plurality of packs 22 are connected sequentially to the electric device 20, the pre-charging is not performed on second battery pack(s) 22 which are battery pack(s) 22 to be connected to the electric device 20 second or later, and therefore the time taken for the pre-charging on the battery pack(s) 22 to be connected second or later is reduced, making it possible to achieve quick activation.

(Item 2-8) The electric working machine 1 according to item 2-7, wherein the controller 23 is configured or programmed to perform, in connecting the battery pack 22 to undergo the pre-charging to the electric device 20, a first former process S13 to bring the one of the external relays 211 that corresponds to the battery pack 22 into the closed state, a second former process S15 to bring the pre-charge relay 224b of the battery pack 22 into the closed state, and a third former process S15 to bring the at least one internal relay 220 of the battery pack 22 into the closed state after the first former process S13 and the second former process S15.

With the electric working machine 1 according to item 2-8, the internal relay 220 is brought into the closed state while the pre-charging is being performed. Therefore, even if the internal relay 220 in the battery pack 22 is brought into the closed state last, the effects of inrush current are prevented or reduced. That is, the inrush current that would act on the internal relay 220 when the internal relay 220 is brought into the closed state is absorbed by the pre-charge resistor 224a, and therefore the damage to the internal relay 220 is prevented or reduced and the battery pack 22 is prevented from being damaged.

(Item 2-9) The electric working machine 1 according to any one of items 2-2 to 2-8, wherein the controller 23 is configured or programmed to select, as the first battery pack 22, one of the battery packs 22 that corresponds to one of the external relays 211 that has been opened and closed the largest number of times.

With the electric working machine 1 according to item 2-9, similarly to the electric working machine 1 according to item 1-6, it is possible to equalize damage to the external relays 211.

(Item 2-10) The electric working machine 1 according to any one of items 2-2 to 2-8, wherein the controller 23 is configured or programmed to use different ones of the battery packs 22 as the first battery pack 22 in turn by changing the first battery pack 22 every time the controller 23 performs a process to connect the battery packs 22 to the electric device 20.

With the electric working machine 1 according to item 2-10, similarly to the electric working machine 1 according to item 1-7, it is possible to equalize damage to the external relays 211.

(Item 2-11) The electric working machine 1 according to any one of items 2-1 to 2-10, further including a working device 11 to perform work, wherein the electric device 20 is operable to drive the working device 11 directly or indirectly.

With the electric working machine 1 according to item 2-11, it is possible to reduce the time taken for the working device 11 to be activated, because the test process and/or the pre-charging is/are skipped when battery packs 22 are connected to the electric device 20.

(Item 2-12) A method of activating an electric working machine 1, the electric working machine 1 including an electric device 20, electric circuitry 21 electrically connected to the electric device 20, and battery packs 22 to be connected sequentially to the electric device 20 via the electric circuitry 21 such that the battery packs 22 are connected in parallel, the battery packs 22 each including at least one internal relay 220 to open and close an internal circuit 222, the electric circuitry 21 including external relays 211 corresponding to the respective battery packs 22 to open and close respective circuits connecting the respective corresponding battery packs 22 to the electric device 20, the method including specifying each of the battery packs 22 as being a battery pack requiring a test process to examine opening and closing actions of the at least one internal relay 220 or a battery pack not requiring the test process, and connecting the battery packs 22 to the electric device 20, the connecting including performing the test process on one or more of the battery packs 22 that have been specified as requiring the test process, and not performing the test process on one or more of the battery packs 22 that have been specified as not requiring the test process.

With the method of activating an electric working machine 1 according to item 2-12, in the step of connecting battery packs 22 to the electric device 20, the test process to examine the opening and closing actions of internal relay(s) 220 is performed on battery pack(s) 22 specified as requiring the test process in the step of specifying each battery pack 22 as being a battery pack requiring or not requiring the test process. This makes it possible to connect the battery packs 22 to the electric device 20 with no internal troubles (such as troubles in the internal relay(s) 220) in the battery packs 22.

On the contrary, in the step of connecting battery packs 22 to the electric device 20, the test process to examine the opening and closing actions of the internal relays 220 of the battery packs 22 is not performed on battery pack(s) 22 specified as not requiring the test process in the step of specifying each battery pack 22 as being a battery pack requiring or not requiring the test process. This makes it possible to reduce the time taken for the battery packs 22 to be connected to the electric device 20.

(Item 2-13) A method of activating an electric working machine 1, the electric working machine 1 including an electric device 20, electric circuitry 21 electrically connected to the electric device 20, and battery packs 22 to be connected sequentially to the electric device 20 via the electric circuitry 21 such that the battery packs 22 are connected in parallel, the battery packs 22 each including at least one internal relay 220 to open and close an internal circuit 222, the electric circuitry 21 including external relays 211 corresponding to the respective battery packs 22 to open and close respective circuits connecting the respective corresponding battery packs 22 to the electric device 20, each of the battery packs 22 including a pre-charge circuit 224, the pre-charge circuit 224 including a series circuit including a pre-charge resistor 224a and a pre-charge relay 224b and connected in parallel to the at least one internal relay 220, the method including specifying each of the battery packs 22 as a battery pack requiring pre-charging in which the pre-charge relay 224b is brought into the closed state before the at least one internal relay 220 is brought into the closed state or as a battery pack not requiring the pre-charging, and connecting the battery packs 22 to the electric device 20, the connecting including, on one or more of the battery packs 22 that have been specified as being a battery pack requiring the pre-charging, performing the pre-charging and then performing a first connecting process (third former process) S15 to bring the at least one internal relay 220 of the one or more of the battery packs 22 into the closed state, and on one or more of the battery packs 22 that have been specified as a battery pack not requiring the pre-charging, not performing the pre-charging and performing the first connecting process (first latter process) S19.

With the method of activating an electric working machine 1 according to item 2-13, in the step of connecting battery packs 22 to the electric device 20, on a battery pack 22 specified as requiring pre-charging in the step of specifying each battery pack 22 as requiring or not requiring pre-charging, the pre-charging is performed and then the first connecting process (third former process) S15 is performed. This makes it possible to connect the battery pack 22 to the electric device 20 with no internal troubles (e.g., troubles resulting from the effects of inrush current on the internal relays 220) in the battery pack 22.

On the contrary, in the step of connecting battery packs 22 to the electric device 20, on a battery pack 22 specified as not requiring pre-charging in the step of specifying each battery pack 22 as requiring or not requiring pre-charging, the pre-charging is not performed (skipped). This makes it possible to reduce the time taken for the battery packs 22 to be connected to the electric device 20.

(Item 3-1) An electric working machine 1 includes an electric device 20, electric circuitry 21 electrically connected to the electric device 20, battery packs 22 to be connected sequentially to the electric device 20 via the electric circuitry 21 such that the battery packs 22 are connected in parallel, the battery packs 22 each including positive and negative external terminals 223a, 223b, and a controller 23, the electric circuitry 21 including external relays 211 corresponding to the respective battery packs 22 to open and close respective circuits connecting the respective corresponding battery packs 22 to the electric device 20, and the controller 23 is configured or programmed to, before connecting a battery pack 22 of the battery packs 22 to the electric device 20, perform an external relay test process to examine whether contacts of a corresponding external relay 211 of the external relays 211 that corresponds to the battery pack 22 are locked while an internal circuit 222 of the battery pack 22 is in an open state, and in the external relay test process, while the controller 23 controls the internal circuit 222 of the battery pack 22 to be in the open state and controls the corresponding external relay 211 to be in the open state, if a voltage between the positive and negative external terminals 223a, 223b of the battery pack 22 is equal to or more than a threshold, determine that the contacts of the external relay 211 are locked, and, if the voltage between the positive and negative external terminals 223a, 223b of the battery pack 22 is less than the threshold, determine that the contacts of the external relay 211 are normal.

With the electric working machine 1 according to item 3-1, since the battery packs 22 are connected sequentially to the electric device 20 such that they are connected in parallel, the circuit connected to each battery pack 22 may have electricity flowing thereinto from another battery pack(s) 22. However, when the external relay 211 corresponding to the battery pack 22 is in the open state, the positive and negative external terminals 223a and 223b of the battery pack 22 are not subjected to the effects of electricity from the other battery packs 22, and the voltage between the positive and negative external terminals 223a and 223b is lower than a threshold.

On the contrary, when the contacts of the external relay 211 are locked (e.g., fused together), the external relay 211 is in the closed state (in the conducting state). When the external relay 211 corresponding to the battery pack 22 is in the closed state (conducting state), the positive and negative external terminals 223a and 223b of the battery pack 22 are subjected to the effects of electricity from another battery pack(s) 22, so that the voltage between the positive and negative external terminals 223a and 223b is equal to or more than the threshold.

Thus, it is possible to appropriately determine whether the contacts of the external relay 211 are locked merely by comparing the voltage between the positive and negative external terminals 223a and 223b of the battery pack 22 with a threshold, without having to actuate the external relay 211. Thus, with the electric working machine 1 configured as described above, it is possible to prevent the internal circuit 222 of the battery pack 22 from being broken under the influence of inrush current at activation, and also possible to appropriately determine whether a plurality of battery packs 22 can be connected sequentially.

(Item 3-2) The electric working machine 1 according to item 3-1, wherein the controller 23 is configured or programmed to, regarding a first battery pack 22 which is one of the battery packs 22 that is to be connected first to the electric device 20, connect the first battery pack 22 to the electric device 20 without performing the external relay test process to examine the corresponding external relay 211 corresponding to the first battery pack 22, and, regarding a second battery pack 22 which is one of the battery packs 22 that is to be connected second or later to the electric device 20, perform the external relay test process to examine the corresponding external relay 211 corresponding to the second battery pack 22 before connecting the second battery pack 22 to the electric device 20.

With the electric working machine 1 according to item 3-2, the first battery pack 22 is electrically connected to the electric device 20 without being subjected to the external relay testing process to examine the corresponding external relay 211. With this, when the external relay testing process is performed on the external relay 211 corresponding to the second battery pack 22, the electric circuitry 21 have electricity flowing thereinto from the first battery pack 22. However, provided that the external relay 211 corresponding to the second battery pack 22 is in the open state, the positive and negative external terminals 223a and 223b of the second battery pack 22 are not subjected to the effects of electricity from the first battery pack 22, so that the voltage between the positive and negative external terminals 223a and 223b of the second battery pack 22 is lower than the threshold.

On the contrary, when the contacts of the external relay 211 are locked (e.g., fused together), the external relay 211 is in the closed state (in the conducting state). When the external relay 211 corresponding to the second battery pack 22 is in the closed state (conducting state), the positive and negative external terminals 223a and 223b of the second battery pack 22 are subjected to the effects of electricity from the first battery pack 22, so that the voltage between the positive and negative external terminals 223a and 223b of the second battery pack 22 is equal to or more than the threshold.

Thus, it is possible to appropriately determine whether the contacts of the external relay 211 are locked merely by comparing the voltage between the positive and negative external terminals 223a and 223b of the second battery pack 22 with a threshold, without having to actuate the external relay 211. Thus, with the electric working machine 1 configured as described above, it is possible to prevent the internal circuit 222 of the battery pack 22 from being broken under the influence of inrush current at activation, and also possible to appropriately determine whether a plurality of battery packs 22 can be connected sequentially.

(Item 3-3) The electric working machine 1 according to item 3-1 or 3-2, wherein the controller 23 is configured or programmed to, if the controller 23 determines that the contacts of the corresponding external relay 211 are locked in the external relay test process, not electrically connect the battery pack 22 corresponding to the corresponding external relay 211 to the electric device 20.

With the electric working machine 1 according to item 3-3, electricity is not supplied to the electric device 20 from battery pack(s) 22 corresponding to external relay(s) 211 in which the contacts are locked, making it possible to prevent electrical accidents.

(Item 3-4) The electric working machine 1 according to any one of items 3-1 to 3-3, wherein each of the battery packs 22 includes a discharge circuit 225 including a discharge resistor 225a and a discharge relay 225b which are connected in series and connecting a portion of the internal circuit 222 that includes the positive external terminal 223a and another portion of the internal circuit 222 that includes the negative external terminal 223b, and the controller 23 is configured or programmed to, if the controller 23 determines that the contacts of the external relay 211 are normal in the external relay test process, perform a discharge relay test process to examine whether contacts of the discharge relay 225b of the battery pack 22 are locked, and, in the discharge relay test process, control the corresponding external relay 211 determined as being normal in the external relay test process to be in the closed state and control the discharge relay 225b of the battery pack 22 to be in the open state, and if the voltage between the positive and negative external terminals 223a, 223b of the battery pack 22 is equal to or more than the threshold and a voltage across the discharge circuit 225 is equal to or less than the threshold, determine that the contacts of the discharge relay 225b of the discharge circuit 225 are locked, and, if the voltage between the positive and negative external terminals 223a, 223b of the battery pack 22 is equal to or more than the threshold and the voltage across the discharge circuit 225 is more than the threshold, determine that the contacts of the discharge relay 225b of the discharge circuit 225 are normal.

The discharge circuit 225 connects the portion of the internal circuit 222 that includes the positive external terminal 223a and the portion of the internal circuit 222 that includes the negative external terminal 223b. Therefore, bringing the discharge relay 225b of the discharge circuit 225 to the closed state closes the internal circuit 222, and, if the circuit in such a condition is energized, the discharge resistor 225a may be broken or the internal circuit 222 may be damaged.

However, with the electric working machine 1 according to item 3-4, the opening/closing-of-relay testing process is used to determine whether the contacts of the discharge relay 225b of the discharge circuit 225 are locked. This makes it possible to prevent the discharge resistor 225a from being broken and prevent the internal circuit 222 from being damaged.

More specifically, as described earlier, when the external relay 211 corresponding to a battery pack 22 is in the closed state (conducting state), the positive and negative external terminals 223a and 223b of the battery pack 22 are subjected to the effects of electricity from another battery pack(s) 22, so that the voltage between the positive and negative external terminals 223a and 223b is equal to or more than a threshold.

Since the discharge circuit 225 connects the portion of the internal circuit 222 that includes the positive external terminal 223a and the portion of the internal circuit 222 that includes the negative external terminal 223b, when the discharge relay 225b is in the closed state, the voltage across the discharge circuit 225 is low. That is, when the discharge relay 225b is in the closed state, electric current flows and the potential difference between the terminals of the discharge circuit 225 is small (or zero), so that the voltage across the discharge circuit 225 is equal to or less than the threshold.

On the contrary, when the discharge relay 225b of the discharge circuit 225 is in the open state, the voltage across the discharge circuit 225 is high (voltage increases). That is, when the discharge relay 225b of the discharge circuit 225 is in the open state, the discharge circuit 225 is disconnected, so that the voltage (potential difference) occurs at the opposite ends (at the positive and negative ends) of the discharge relay 225b. That is, when the discharge relay 225b is in the open state, the voltage (potential difference) across the discharge circuit 225 increases above (higher than) the threshold.

Thus, it is possible to appropriately determine whether the contacts of the discharge relay 225b of the discharge circuit 225 are locked based on the voltage between the external terminals 223a and 223b and the voltage across the discharge circuit 225, and thus possible to prevent the internal circuit 222 and the discharge circuit 225 (discharge resistor 225a) from being broken.

(Item 3-5) An electric working machine 1 including an electric device 20, electric circuitry 21 electrically connected to the electric device 20, battery packs 22 to be connected sequentially to the electric device 20 via the electric circuitry 21 such that the battery packs 22 are connected in parallel, the battery packs 22 each including positive and negative external terminals 223a, 223b, and a controller 23, the electric circuitry 21 including external relays 211 corresponding to the respective battery packs 22 to open and close respective circuits connecting the respective corresponding battery packs 22 to the electric device 20, each of the battery packs 22 includes a discharge circuit 225 including a discharge resistor 225a and a discharge relay 225b which are connected in series and connecting a portion of an internal circuit 222 of the battery pack 22 that includes the negative external terminal 223b and another portion of the internal circuit 222 that includes the positive external terminal 223a, and the controller 23 is configured or programmed to, in connecting the battery pack 22 to the electric device 20, perform a discharge relay test process to examine whether contacts of the discharge relay 225b of the battery pack 22 are locked, in the discharge relay test process, control a corresponding external relay 211 of the external relays 211 that corresponds to the battery pack 22 to be in a closed state and control the discharge relay 225b of the battery pack 22 to be in an open state, and if a voltage between the positive and negative external terminals 223a, 223b of the battery pack 22 is equal to or more than a threshold and a voltage across the discharge circuit 225 is equal to or less than the threshold, determine that the contacts of the discharge relay 225b of the discharge circuit 225 are locked, and, if the voltage between the positive and negative external terminals 223a, 223b of the battery pack 22 is equal to or more than the threshold and the voltage across the discharge circuit 225 is more than the threshold, determine that the contacts of the discharge relay 225b of the discharge circuit 225 are normal.

With the electric working machine 1 according to item 3-5, when the external relay 211 corresponding to a battery pack 22 is in the closed state (conducting state), the positive and negative external terminals 223a and 223b of the battery pack 22 are subjected to the effects of electricity from another battery pack(s) 22, so that the voltage between the positive and negative external terminals 223a and 223b is equal to or more than the threshold.

Since the discharge circuit 225 connects the portion of the internal circuit 222 that includes the positive external terminal 223a and the portion of the internal circuit 222 that includes the negative external terminal 223b, when the discharge relay 225b is in the closed state, the voltage across the discharge circuit 225 is low. That is, when the discharge relay 225b is in the closed state, electric current flows and the potential difference between the terminals of the discharge circuit 225 is small (or zero), so that the voltage across the discharge circuit 225 is equal to or less than the threshold.

On the contrary, when the discharge relay 225b of the discharge circuit 225 is in the open state, the voltage across the discharge circuit 225 is high (voltage increases). That is, when the discharge relay 225b of the discharge circuit 225 is in the open state, the discharge circuit 225 is disconnected, so that the voltage (potential difference) occurs at the opposite ends (at the positive and negative ends) of the discharge relay 225b. That is, when the discharge relay 225b is in the open state, the voltage (potential difference) across the discharge circuit 225 increases above (higher than) the threshold.

Thus, it is possible to appropriately determine whether the contacts of the discharge relay 225b of the discharge circuit 225 are locked based on the voltage between the external terminals 223a and 223b and the voltage across the discharge circuit 225, and thus possible to prevent the internal circuit 222 and the discharge circuit 225 (discharge resistor 225a) from being broken.

(Item 3-6) The electric working machine 1 according to item 3-4 or 3-5, wherein the controller 23 is configured or programmed to, in the discharge relay test process, if the controller 23 determines that the contacts of the discharge relay 225b of the battery pack 22 are locked, not electrically connect the battery pack 22 to the electric device 20.

With the electric working machine 1 according to item 3-6, electricity is not supplied to the electric device 20 from battery pack(s) 22 corresponding to external relay(s) 211 in which the contacts are locked, making it possible to prevent electrical accidents.

(Item 3-7) The electric working machine 1 according to item 3-2 or according to item 3-3 taken in combination with item 3-2, wherein the controller 23 is configured or programmed to select, as the first battery pack 22, one of the battery packs 22 that corresponds to one of the external relays 211 that has been opened and closed the largest number of times.

With the electric working machine 1 according to item 3-7, it is possible to equalize the damage to the external relays 211, similarly to the electric working machine 1 according to item 1-6 and item 2-9.

(Item 3-8) The electric working machine 1 according to item 3-2 or according to item 3-3 taken in combination with item 3-2, wherein the controller 23 is configured or programmed to use different ones of the battery packs 22 as the first battery pack 22 in turn by changing the first battery pack 22 every time the controller 23 performs a process to connect the battery packs 22 to the electric device 20.

With the electric working machine 1 according to item 3-8, it is possible to equalize the damage to the external relays 211, similarly to the electric working machine 1 according to item 1-7 and item 2-10.

(Item 3-9) The electric working machine 1 according to any one of items 3-1 to 3-8, further including a working device 11 to perform work, wherein the electric device 20 is operable to drive the working device 11 directly or indirectly.

With the electric working machine 1 according to item 3-9, the electric device 20 drives the working device 11 by receiving electricity from the battery pack(s) 22 in which the internal circuit 222 is prevented from being damaged. This eliminates or reduce the likelihood that power failure will occur when the electric device 20 drives the working device 11.

(Item 3-10) A method of activating an electric working machine 1, the electric working machine 1 including an electric device 20, electric circuitry 21 electrically connected to the electric device 20, and battery packs 22 to be connected sequentially to the electric device 20 via the electric circuitry 21 such that the battery packs 22 are connected in parallel, the battery packs 22 each including positive and negative external terminals 223a, 223b, the electric circuitry 21 including external relays 211 corresponding to the respective battery packs 22 to open and close respective circuits connecting the respective corresponding battery packs 22 to the electric device 20, the method including, before connecting a battery pack 22 of the battery packs 22 to the electric device 20, performing an external relay test process to examine whether contacts of an external relay 211 of the external relays 211 that corresponds to the battery pack 22 are locked while an internal circuit 222 of the battery packs 22 is in an open state, and in the external relay test process, while the internal circuit 222 of the battery pack 22 is controlled to be in the open state and the external relay 211 corresponding to the battery pack 22 is controlled to be in the open state, if a voltage between the positive and negative external terminals 223a, 223b of the battery pack 22 is equal to or more than a threshold, determining that the contacts of the external relay 211 are locked, and, if the voltage between the positive and negative external terminals 223a, 223b of the battery pack 22 is less than the threshold, determining that the contacts of the external relay 211 are normal.

With the method of activating an electric working machine 1 according to item 3-10, since the battery packs 22 are connected sequentially to the electric device 20 such that they are connected in parallel, the circuit connected to each battery pack 22 may have electricity flowing thereinto from another battery pack(s) 22. However, when the external relay 211 corresponding to the battery pack 22 is in the open state, the positive and negative external terminals 223a and 223b of the battery pack 22 are not subjected to the effects of electricity from the other battery packs 22, and the voltage between the positive and negative external terminals 223a and 223b is lower than a threshold. On the contrary, when the contacts of the external relay 211 are locked (e.g., fused together), the external relay 211 is in the closed state (in the conducting state). When the external relay 211 corresponding to the battery pack 22 is in the closed state (conducting state), the positive and negative external terminals 223a and 223b of the battery pack 22 are subjected to the effects of electricity from another battery pack(s) 22, so that the voltage between the positive and negative external terminals 223a and 223b is equal to or more than the threshold.

Thus, with the above-described method, it is possible to appropriately determine whether the contacts of the external relay 211 are locked merely by comparing the voltage between the positive and negative external terminals 223a and 223b of the battery pack 22 with a threshold, without having to actuate the external relay 211. Thus, with the method of activating an electric working machine 1 configured as described above, it is possible to prevent the internal circuit 222 of the battery pack 22 from being broken under the influence of inrush current at activation, and also possible to appropriately determine whether a plurality of battery packs 22 can be connected sequentially.

(Item 3-11) A method of activating an electric working machine 1, the electric working machine 1 including an electric device 20, electric circuitry 21 electrically connected to the electric device 20, and battery packs 22 to be connected sequentially to the electric device 20 via the electric circuitry 21 such that the battery packs 22 are connected in parallel, the battery packs 22 each including positive and negative external terminals 223a, 223b, the electric circuitry 21 including external relays 211 corresponding to the respective battery packs 22 to open and close respective circuits connecting the respective corresponding battery packs 22 to the electric device 20, and each of the battery packs 22 includes a discharge circuit 225 including a discharge resistor 225a and a discharge relay 225b connected in series and connecting a portion of an internal circuit 222 of the battery pack 22 that includes the negative external terminal 223b and another portion of the internal circuit 222 that includes the positive external terminal 223a, the method including in connecting the battery pack 22 to the electric device 20, performing a discharge relay test process to examine whether contacts of the discharge relay 225b of the battery pack 22 are locked, in the discharge relay test process, controlling a corresponding external relay 211 of the external relays 211 that corresponds to the battery pack 22 to be in a closed state and controlling the discharge relay 225b of the battery pack 22 to be in an open state, and if a voltage between the positive and negative external terminals 223a, 223b of the battery pack 22 is equal to or more than a threshold and a voltage across the discharge circuit 225 is equal to or less than the threshold, determining that the contacts of the discharge relay 225b of the discharge circuit 225 are locked, and, if the voltage between the positive and negative external terminals 223a, 223b of the battery pack 22 is equal to or more than the threshold and the voltage across the discharge circuit 225 is more than the threshold, determining that the contacts of the discharge relay 225b of the discharge circuit 225 are normal.

With the method of activating an electric working machine 1 according to item 3-11, when the external relay 211 corresponding to the battery pack 22 is in the closed state (conducting state), the positive and negative external terminals 223a and 223b of the battery pack 22 are subjected to the effects of electricity from another battery pack(s) 22, so that the voltage between the positive and negative external terminals 223a and 223b is equal to or more than the threshold.

Since the discharge circuit 225 connects the portion of the internal circuit 222 that includes the positive external terminal 223a and the portion of the internal circuit 222 that includes the negative external terminal 223b, when the discharge relay 225b is in the closed state, the voltage across the discharge circuit 225 is low. That is, when the discharge relay 225b is in the closed state, electric current flows and the potential difference between the terminals of the discharge circuit 225 is small (or zero), so that the voltage across the discharge circuit 225 is equal to or less than the threshold.

On the contrary, when the discharge relay 225b of the discharge circuit 225 is in the open state, the voltage across the discharge circuit 225 is high (voltage increases). That is, when the discharge relay 225b of the discharge circuit 225 is in the open state, the discharge circuit 225 is disconnected, so that the voltage (potential difference) occurs at the opposite ends (at the positive and negative ends) of the discharge relay 225b. That is, when the discharge relay 225b is in the open state, the voltage (potential difference) across the discharge circuit 225 increases above (higher than) the threshold.

Thus, with the method configured as described above, it is possible to appropriately determine whether the contacts of the discharge relay 225b of the discharge circuit 225 are locked based on the voltage between the external terminals 223a and 223b and the voltage across the discharge circuit 225, and thus possible to prevent the internal circuit 222 and the discharge circuit 225 (discharge resistor 225a) from being broken.

(Item 4-1) An electric working machine 1 including an electric device 20, electric circuitry 21 electrically connected to the electric device 20, battery packs 22 to be connected to the electric device 20 via the electric circuitry 21, and a controller 23, the controller 23 being configured or programmed to include a driving mode in which the controller 23 drives the electric device 20 using electricity supplied from one or more of the battery packs 22 and a charging mode in which the controller 23 charges one or more of the battery packs 22, and the controller is configured or programmed to, in the driving mode, if a voltage difference between the battery packs 22 is greater than a predetermined reference, connect only one of the battery packs 22 that has a highest voltage to the electric device 20 to drive the electric device 20.

With the electric working machine 1 according to item 4-1, in the driving mode, if the voltage difference between a plurality of battery packs 22 is more than a reference value (range), i.e., if it is estimated that the flow of electricity that would occur between a plurality of battery packs 22 when they are connected in parallel would exceed a tolerance, the battery pack 22 with the highest voltage is connected to the electric device 20 to drive the electric device 20. With this, the battery packs 22 having a great voltage difference are prevented from being connected in parallel to each other, and the battery packs 22 are prevented from being damaged, as well as electricity supply to the electric device 20 can be achieved. That is, the electric working machine 1 configured as described above makes it possible to prevent a plurality of battery packs 22 from being broken by being connected in parallel to each other.

(Item 4-2) The electric working machine 1 according to item 1, wherein the controller 23 is configured or programmed to, after connecting only one of the battery packs 22 that has the highest voltage to the electric device 20 to start driving the electric device 20, if the voltage difference between the one of the battery packs 22 and another of the battery packs 22 decreases below the predetermined reference, connect the one of the battery packs 22 and the another of the battery packs 22 to the electric device 20 to drive the electric device 20.

With the electric working machine 1 according to item 4-2, a plurality of battery packs 22, having a small (or no) voltage difference, supply electricity to the electric device 20. With this, the flow of electricity that would result from the voltage difference between the battery packs 22 would not occur between the battery packs 22, and it is possible to efficiently supply electricity to the electric device 20.

(Item 4-3) The electric working machine 1 according to item 4-1 or 4-2, further including a notifier 142 to provide a notification to a user, wherein the controller 23 is configured or programmed to, if the voltage difference between the battery packs 22 is greater than the predetermined reference, cause the notifier 142 to provide the notification indicating that charging is required for one or more of the battery packs 22.

With the electric working machine 1 according to item 4-3, it is possible to request the user to charge the battery pack(s) 22 via the notifier 142, making it possible to charge the battery pack(s) 22 at an early stage. In particular, since the notifier 142 provides a notification requesting the user to perform charging, the charging will be performed earlier than without the notification and the battery pack(s) 22 with low voltage can be recharged early.

(Item 4-4) The electric working machine 1 according to any one of items 4-1 to 4-3, wherein the controller 23 is configured or programmed to, in the charging mode, if the voltage difference between the battery packs 22 is greater than the predetermined reference, determine only one of the battery packs 22 that has a lowest voltage as being a battery pack to be charged, and perform a charging process to charge the one of the battery packs 22.

With the electric working machine 1 according to item 4-4, only battery pack(s) 22 with low voltage is subjected to the charging process, and therefore only the battery pack(s) 22 with low voltage increases in voltage. This results in a reduction in (or elimination of) voltage difference between the battery pack 22 to be charged and another battery pack 22 not to be charged. This eliminates or reduce the likelihood that electricity will flow between a plurality of battery packs 22 when they are connected in parallel to supply electricity to the electric device 20, and the electricity is efficiently supplied to the electric device 20.

(Item 4-5) An electric working machine 1 including an electric device 20, electric circuitry 21 electrically connected to the electric device 20, battery packs 22 to be connected to the electric device 20 via the electric circuitry 21, and a controller 23, the controller 23 being configured or programmed to include a driving mode in which the controller 23 drives the electric device 20 using electricity supplied from one or more of the battery packs 22 and a charging mode in which the controller 23 charges one or more of the battery packs 22, and the controller 23 is configured or programmed to, in the charging mode, if the voltage difference between the battery packs 22 is greater than a predetermined reference, determine only one of the battery pack 22 that has a lowest voltage as being a battery pack to be charged, and perform a charging process to charge the one of the battery packs 22.

With the electric working machine 1 according to item 4-5, in the charging mode, only battery pack(s) 22 with the lowest voltage is subjected to the charging process, and therefore only the battery pack 22 with the lowest voltage increases in voltage. This results in a reduction in (or elimination of) voltage difference between the battery pack 22 to be charged and another battery pack 22 not to be charged. This eliminates or reduce the likelihood that electricity will flow between a plurality of battery packs 22 when they are connected in parallel to supply electricity to the electric device 20, and the electricity is efficiently supplied to the electric device 20.

(Item 4-6) The electric working machine 1 according to items 4-4 or 4-5, wherein the controller 23 is configured or programmed to, after determining only one of the battery packs 22 that has the lowest voltage as being the battery pack to be charged and starting the charging process, if the voltage difference between the one of the battery packs 22 and another of the battery packs 22 decreases below the predetermined reference, determine the one of the battery packs 22 and the another of the battery packs 22 as being battery packs to be charged and perform the charging process to charge the one of the battery packs 22 and the another of the battery packs 22.

With the electric working machine 1 according to item 4-6, the charging process is performed, so that the battery pack 22 with the lowest voltage increases in voltage and approaches the voltage of the another battery pack 22.

It follows that, when the voltage difference between the battery packs 22 decreases below the reference, the voltage difference is small or zero. In such a condition, the another battery pack 22 is also subjected to the charging process, so that the battery packs 22 are charged while there is no (or a small) voltage difference. Thus, electricity is efficiently supplied from a plurality of battery packs 22 to the electric device 20 such that the flow of electricity that would occur between the battery packs 22 when they are connected to the electric device 20 is prevented or reduced.

(Item 4-7) The electric working machine 1 according to any one of items 4-1 to 4-6, further including a charging inlet 25 connectable to a charger and electrically connected to the battery packs 22 via the electric circuitry 21, wherein the controller 23 is configured or programmed to perform the charging mode when the charger is connected to the charging inlet 25.

With the electric working machine 1 according to item 4-7, the charging mode is entered automatically without requiring the user to switch the modes.

(Item 4-8) The electric working machine 1 according to item 4-7, the electric circuitry 21 including external relays 211 corresponding to the respective battery packs 22 to open and close respective circuits connecting the respective corresponding battery packs 22 to the charging inlet 25, and the controller 23 is configured or programmed to, in the charging mode, bring one or more of the external relays 211 that correspond to one or more of the battery pack 22 that are to be charged to a closed state, and bring one or more of the external relays 211 that correspond to one or more of the battery pack 22 that are not to be charged to an open state.

With the electric working machine 1 according to item 4-8, it is possible to use the path to supply electricity from the battery pack 22 to the electric device 20 as a path for charging, and also possible to only charge the battery pack 22 determined to be charged.

(Item 4-9) The electric working machine 1 according to any one of items 4-1 to 4-8, further including a working device 11 to perform work, wherein the electric device 20 is operable to drive the working device 11 directly or indirectly.

With the electric working machine 1 according to item 4-9, since at least a battery pack with high voltage (high in charge) supplies electricity to the electric device, it is possible to achieve long, stable driving.

(Item 4-10) A method of activating an electric working machine 1, the electric working machine 1 including an electric device 20, electric circuitry 21 electrically connected to the electric device 20, and battery packs 22 to be connected to the electric device 20 via the electric circuitry 21, the electric working machine 1 including a driving mode in which the electric device 20 is driven using electricity supplied from one or more of the battery packs 22 and a charging mode in which one or more of the battery packs 22 are charged, the method including, in the driving mode, if a voltage difference between the battery packs 22 is greater than a predetermined reference, connecting only one of the battery packs 22 that has a highest voltage to the electric device 20 to drive the electric device 20.

With the method of activating an electric working machine 1 according to item 4-10, in the driving mode, if the voltage difference between a plurality of battery packs 22 is more than a reference, i.e., if it is estimated that the flow of electricity that would occur between a plurality of battery packs 22 when they are connected in parallel would exceed a tolerance, the battery pack 22 with the highest voltage is connected to the electric device 20 to drive the electric device 20.

With this, the battery packs 22 having a great voltage difference are prevented from being connected in parallel to each other, and the battery packs 22 are prevented from being damaged, as well as electricity supply to the electric device 20 can be achieved. That is, the method of activating an electric working machine 1 configured as described above makes it possible to prevent a plurality of battery packs 22 from being broken by being connected in parallel to each other.

(Item 4-11) A method of charging an electric working machine 1, the electric working machine 1 including an electric device 20, electric circuitry 21 electrically connected to the electric device 20, and battery packs 22 to be connected to the electric device 20 via the electric circuitry 21, the electric working machine 1 including a driving mode in which the electric device 20 is driven using electricity supplied from one or more of the battery packs 22 and a charging mode in which one or more of the battery packs 22 are charged, the method including in the charging mode, if a voltage difference between the battery packs 22 is greater than a predetermined reference, determining only one of the battery packs 22 that has a lowest voltage as being a battery pack to be charged, and performing a charging process to charge the one of the battery packs 22.

With the method of charging an electric working machine 1 according to item 4-11, in the charging mode, only the battery pack 22 with the lowest voltage is subjected to the charging process, and therefore only the battery pack 22 with the lowest voltage increases in voltage. This results in a reduction in (or elimination of) voltage difference between the battery pack 22 to be charged and another battery pack 22 not to be charged. This eliminates or reduce the likelihood that electricity will flow between a plurality of battery packs 22 when they are connected in parallel to supply electricity to the electric device 20, and the electricity is efficiently supplied to the electric device 20.

Note that the present invention is not limited to example embodiments as described above, and may be modified without departing from the scope and spirit of the present invention.

In the example embodiments described so far, two battery packs 22 are connected in parallel. Note, however, that this does not imply any limitation. For example, the electric working machine 1 may include three or more battery packs 22, and the three or more battery packs 22 may be connected in parallel to supply electricity to electric device(s) 20. That is, the number of battery packs 22 is not limited, provided that a plurality of battery packs 22 can be connected in parallel to reduce the current value of each battery pack 22.

Even in this case, the connection control (process) on the first battery pack 22, and the connection control (process) on the second battery pack(s) 22 are the same as described in the above example embodiments.

In the above example embodiments, the controller 23 selects, as the first battery pack 22 (the battery pack 22 to be connected first), the battery pack 22 corresponding to the external relay 211 which corresponds to any of second battery pack(s) 22 and which has been opened and closed the largest number of times, based on the accumulated number of opening and closing actions of each of a plurality of external relays 211. Note, however, that this does not imply any limitation. As described above, the controller 23 may use different battery packs 22 as the first battery pack 22 in turn by changing the first battery pack 22 each time the activation is performed (every time the controller 23 performs a process to connect a plurality of battery packs 22 to the electric device 20), regardless of the number of opening and closing actions of the external relays 211. By doing so, similarly to the example embodiments described above, the damaged suffered by a plurality of external relays 211 can be equalized.

Specifically, the damage suffered by the external relay 211 differs depending on the number of opening and closing actions. That is, when the number of opening and closing actions of the external relay 211 increases, the damages it suffers from opening and closing the circuit increases accordingly. On the contrary, when the number of opening and closing actions decreases, the damage it suffers from opening and closing the circuit decreases. Accordingly, by using different battery packs 22 as the first battery pack 22 connected first to the electric device 20 (electric circuitry 21) in turn by changing the first battery pack 22 each time the electric device 20 is activated, the external relay 211 brought into the closed state first also changes, making it possible to equalize the damage on a plurality of external relays 211. With this, the failure of a specific external relay 211 can be avoided or reduced.

In the above example embodiments, the crawler travel mechanisms 101 are used, but this does not imply any limitation. For example, the travel mechanisms 101 can be wheeled (tire) travel mechanism(s) including a pair of front wheels and a pair of rear wheels. In such a case, each of the front and rear wheels may be driven, or only the front wheels or the rear wheels may be driven.

In the above example embodiments, each of the plurality of battery packs 22 includes a pre-charge circuit 224, but this does not imply any limitation. For example, in a case that a specific battery pack 22 is connected first to the electric device 20 (electric circuitry 21), at least only the battery pack 22 to be connected first may include a pre-charge circuit 224 which includes a pre-charge resistor 224a and a pre-charge relay 224b and which is connected in parallel to the first internal relay 220 (220a). However, as in the example embodiments described above, in a case where the battery pack 22 to be connected first is changed, each of a plurality of battery packs 22 needs to include the pre-charge circuit 224.

In the above example embodiments, the controller 23 of the electric working machine 1 includes the ECU 23a to control the entirety of the electric working machine 1 and the BMSs 23b to monitor and control the battery packs 22, and the ECU 23a is configured or programmed to perform various processes, but this does not imply any limitation. For example, the BMSs 23b may be configured or programmed to perform (perform processes of) a whether-to-make-parallel-connection test, a process to connect battery packs 22 in parallel, a process to connect a single battery pack 22, a test for failure, and a charging mode. Such processes, etc., may be shared between the ECU 23a and BMSs 23b. In addition to the ECU 23a and the BMSs 23b, the controller 23 may also include dedicated controller(s) (controller unit (s)) for use in the whether-to-make-parallel-connection test, the process to connect battery packs 22 in parallel, the process to connect a single battery pack 22, the test for failure, and/or the charging mode.

In the above example embodiments, the internal relays 220 of each of a plurality of battery packs 22 include the first internal relay 220a and the second internal relay 220b, but this does not imply any limitation. For example, the internal relay 220 of each of the plurality of battery packs 22 may include only the first internal relay 220a or the second internal relay 220b. That is, each of the plurality of battery packs 22 need only include at least one internal relay 220 to open and close the internal circuit 222.

In the above example embodiments, each of a plurality of battery packs 22 includes, as the internal relays 220, the positive (P)-side first internal relay 220a and the negative (N)-side second internal relay 220b, as well as including the pre-charge circuit 224 (pre-charge resistor 224a, pre-charge relay 224b) connected in parallel to the positive (P)-side first internal relay 220a, and, based on this, when the first battery pack 22 is connected to the electric device 20, the negative (N)-side second internal relay 220b and to the pre-charge relay 224b of the pre-charge circuit 224 are brought into (concurrently) the closed state. Note, however, that this does not imply any limitation. For example, when the first battery pack 22 is connected to the electric device 20, the negative (N)-side second internal relay 220b and the pre-charge relay 224b of the pre-charge circuit 224 may be brought into the closed state at different timings. However, in that case, it is necessary that the internal relay 220 (the positive (P)-side first internal relay 220a) in parallel to the pre-charge circuit 224 be brought into the closed state last. In a case that a battery pack 22 includes a single internal relay 220 to open and close the internal circuit 222 and includes a pre-charge circuit 224 connected in parallel to the single internal relay 220, it is only necessary that the internal relay 220 be brought into the closed state after the pre-charge relay 224b of the pre-charge circuit 224 is brought into the closed state.

In the above example embodiments, the second former process S15 is performed after the first former process S13, but this does not imply any limitation. Specifically, with regard to the electric device 20, the external relay 211 corresponding to the first battery pack 22 is brought into the closed state and then the internal relay 220 (first internal relay 220a) in parallel to the pre-charge circuit 224 (pre-charge relay 224b) is brought into the closed state, but this does not imply any limitation. For example, with regard to the electric device 20, the pre-charge circuit 224 (pre-charge relay 224b) of the first battery pack 22 may be brought into the closed state and then the external relay 211 corresponding to the first battery pack 22 may be brought into the closed state. Alternatively, with regard to the electric device 20, the pre-charge circuit 224 (pre-charge relay 224b) of the first battery pack 22 and the external relay 211 corresponding to the battery pack 22 may be brought into the closed state concurrently. That is, the first former process S13 and the second former process S15 may be swapped in order, and may be performed at the same time.

Note, however, that in all such cases, the internal relay 220 (first internal relay 220a) in parallel to the pre-charge circuit 224 (pre-charge relay 224b) is brought into the closed state after the pre-charge circuit 224 (pre-charge relay 224b) is brought into the closed state (after a pre-charge is performed). That is, the third former process S15 is performed after the first former process S13 and the second former process S15. In order to ensure that the pre-charge is performed, it is preferable that the external relay 211 be brought into the closed state and then the pre-charge circuit 224 (pre-charge relay 224b) be brought into the closed state, in the same manner as the above example embodiments.

In the above example embodiments, the storing unit of the ECU 23a of the controller 23 stores the specification of whether the test to examine the opening and closing actions of the internal relay(s) 220 of second battery pack(s) 22 is required or not, the specification of whether the pre-charge using the pre-charge circuit 224 of the second battery pack 22 is required or not, and the specification of whether to bring the first internal relay 220a and the second internal relay 220b concurrently to the closed state, but this does not imply any limitation. For example, the storing unit of the ECU 23a may store only the specification of whether the test to examine the opening and closing actions is required or not, which takes time when connecting a plurality of battery packs 22. As described above, the specifications stored in the storing unit may be fixed specifications which can be changed.

In the above example embodiments, a plurality of battery packs 22 and a plurality of electric devices 20 are electrically connected via the electric circuitry 21, but this does not imply any limitation. For example, a plurality of battery packs 22 and a single electric device 20 may be connected via the electric circuitry 21. That is, provided that a plurality of battery packs 22 are connected in parallel, it does not matter how many of electric devices 20 (electric devices 20 for output) are supplied with electricity from the battery packs 22. Note that the number of secondary circuits 212 of the electric circuitry 21 corresponds to the number of electric device(s) 20. Accordingly, as described above, in the case where a single electric device 20 is connected to a plurality of battery packs 22, a single secondary circuit 212 (one set of the positive secondary circuit pathway 212a and the negative secondary circuit pathway 212b) is provided.

In the above example embodiments, when the first battery pack 22 is connected to the electric device 20, the test process to examine the opening and closing actions of the internal relay 220 is performed, the first former process to bring the external relay 211 corresponding to the first battery pack 22 into the closed state is performed, and then the third former process to bring the internal relays 220 of the first battery pack 22 into the closed state is performed. Note, however, that this does not imply any limitation. For example, the specification may be such that the test process to examine the opening and closing actions of the internal relays 220 is not required (not to be performed) when the first battery pack 22 is connected to the electric device 20.

Alternatively, when the first battery pack 22 is connected to the electric device 20, the test process to examine the opening and closing actions of the internal relays 220 may be performed, and the third former process to bring the internal relays 220 of the first battery pack 22 into the closed state may be performed and then the first former process to bring the external relay 211 corresponding to the first battery pack 22 into the closed state may be performed. However, in the case where pre-charge is to be performed, provided that a second former process including performing a pre-charge is performed between the first former process and the third former process, the effects the relay switch (internal relay 220 or external relay 211) brought last into the closed state suffers from inrush current can be prevented or reduced.

In the above example embodiments, when the first battery pack 22 is connected to the electric device 20, a pre-charge is performed. Note, however, that this does not imply any limitation. For example, when the first battery pack 22 is connected to the electric device 20, the specification may be such that a pre-charge is not required (not performed) when the first battery pack 22 is connected to the electric device 20. In this case, similarly to the second battery packs 22, the internal relays 220 of the first battery pack 22 may be brought into the closed state (the first connecting process may be performed) and then the external relay 211 corresponding to the first battery pack 22 may be brought into the closed state (the second connecting process may be performed) so that inrush current will not act on the internal relays 220.

In the above example embodiments, regarding the opening and closing of the internal relays 220 of the second battery pack 22 when the second battery pack 22 is connected to the electric device 20, the first internal relay 220a and the second internal relay 220b are brought together (concurrently) into the closed state, but this does not imply any limitation. For example, regarding the opening and closing of the second internal relays 220 of the second battery pack 22 when the second battery pack 22 is connected to the electric device 20, the second internal relay 220b may be brought into the closed state and then the first internal relay 220a may be brought into the closed state.

Also, regarding the first battery pack 22, the first internal relay 220a and the second internal relay 220b may be brought together (concurrently) into the closed state. That is, in the case where the internal relays 220 of the battery pack 22 include the first internal relay 220a and the second internal relay 220b and, in the first connecting process to bring the internal relays 220 to the closed state, it is possible to specify whether to bring the first internal relay 220a and the second internal relay 220b concurrently to the closed state, the first internal relay 220a and the second internal relay 220b may be brought into the closed state accordingly to that specification.

Accordingly, about the first connecting process including bringing the internal relays 220 into the closed state, in the case where it is specified that the first internal relay 220a and the second internal relay 220b are to be concurrently brought into the closed state, the first internal relay 220a and the second internal relay 220b may be concurrently brought into the closed state. On the contrary, about the first connecting process including bringing the internal relays 220 into the closed state, in the case where it is specified that the first internal relay 220a and the second internal relay 220b are not to be concurrently brought into the closed state, the first internal relay 220a and the second internal relay 220b may be brought into the closed state at different times.

In the above example embodiments, the voltage difference between a plurality of battery packs 22 is corrected in the following manner: the battery pack 22 with the lowest voltage only is charged, and when the voltage of that battery pack 22 reaches the voltage corresponding to the voltage of the battery pack 22 with the highest voltage, the battery pack 22 with the highest voltage also stats to be charged. However, for example, the controller 23 may connect only the battery pack 22 with the highest voltage to the electric device 20 to start driving the electric device 20 and, after that, when the voltage difference between the battery pack 22 connected to the electric device 20 (the battery pack providing electricity) and the other battery pack(s) (battery pack 22 with a low voltage and not providing electricity) decreases below a reference, the controller 23 may drive the electric device 20 using the battery pack 22 connected to the electric device 20 (the battery pack providing electricity) and the other battery pack(s) (battery pack 22 with a low voltage and not providing electricity) by also connecting the other battery pack(s) (battery pack 22 with a low voltage and not providing electricity) to the electric device 20.

By doing so, there is no or little voltage difference between a plurality of battery packs 22, and therefore in the situation where a plurality of battery packs 22 are connected to the electric device 20, electricity flowing from one battery pack 22 to another can be prevented, and damage to the battery pack 22 can be avoided or reduced.

In the above example embodiments, although not especially mentioned, since the inverter 20a as the electric device 20 drives the electric motor 16 which drives the hydraulic pump 15, the inverter 20a indirectly drives the working device 11. However, the electric device 20 to drive the working device 11 is not limited to those which indirectly drive the working device 11. For example, the electric device 20 to drive the working device 11 may be an electric actuator that directly drives the working device 11 and may be supplied with electricity directly from the battery packs 22.

In the above example embodiments, the working device 11 of the electric working machine 1 includes a shovel device 11b including a bucket 112b and an arm 111b having the bucket 112b connected to the distal end thereof, but this does not imply any limitation. For example, the shovel device 11b may include a bucket 112b as its basic element, and the bucket 112b may be replaced with other working tools. The working device 11 may be a dedicated working device in which some other working tool is attached to the distal end of the arm 111b which is an element of the shovel device 11b. Examples of other working tools include hydraulic breakers, hydraulic crushers, angle brooms, earth augers, pallet forks, sweepers, mowers, and snow blowers.

In the above example embodiments, the electric working machine 1 for construction including the working device 11 which includes the dozer device 11a and the shovel device 11b is described, but this does not imply any limitation. For example, the electric working machine 1 may be an electric working machine 1 for carrying things or for agricultural work. That is, the electric working machine 1 may not only be a construction machine but also be a transporting machine (e.g., forklift) or an agricultural machine (e.g., tractor), etc.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electric working machine comprising:
   an electric device;
   electric circuitry electrically connected to the electric device;
   battery packs to be connected sequentially to the electric device via the electric circuitry such that the battery packs are connected in parallel, the battery packs each including at least one internal relay to open and close an internal circuit; and
   a controller; wherein
   each of the battery packs includes a pre-charge circuit, the pre-charge circuit including a series circuit including a pre-charge resistor and a pre-charge relay and connected in parallel to the at least one internal relay;
   the electric circuitry includes external relays corresponding to the respective battery packs to open and close respective circuits connecting the respective corresponding battery packs to the electric device; and
   the controller is configured or programmed to:
      specify each of the battery packs as being a battery pack requiring a test process to examine opening and closing actions of the at least one internal relay or a battery pack for which the test process is to be skipped;
      specify each of the battery packs as a battery pack requiring pre-charging in which the pre-charge relay is brought into a closed state before the at least one internal relay is brought into the closed state or as a battery pack for which the pre-charging is to be skipped;
      in connecting the battery packs to the electric device, perform the test process on one or more of the battery packs that have been specified as requiring the test process to examine the opening and closing actions; and
      skip the test process on one or more of the battery packs that have been specified as being a battery pack for which the test process to examine the opening and closing actions is to be skipped;
      in connecting one or more of the battery packs that have been specified as requiring the pre-charging to the electric device,
         perform the pre-charging and then perform a first connecting process to bring the at least one internal relay of the one or more of the battery packs into the closed state; and
      in connecting one or more of the battery packs that have been specified as being a battery pack for which the pre-charging is skipped to the electric device,
         skip the pre-charging and perform the first connecting process.

2. The electric working machine according to claim 1, wherein the controller is configured or programmed to:
   specify a first battery pack as being a battery pack to undergo the test process, the first battery pack being one of the battery packs that is to be connected first to the electric device; and
   specify a second battery pack as being a battery pack for which the test process is to be skipped, the second battery pack being one of the battery packs that is to be connected second or later to the electric device.

3. The electric working machine according to claim 1, wherein the controller is configured or programmed to examine the opening and closing actions of the at least one internal relay based on an instruction to open or close the at least one internal relay and based on a change in voltage outputted from the battery pack that corresponds to the instruction to open or close the at least one internal relay.

4. An electric working machine comprising:
   an electric device;
   electric circuitry electrically connected to the electric device;
   battery packs to be connected sequentially to the electric device via the electric circuitry such that the battery packs are connected in parallel, the battery packs each including at least one internal relay to open and close an internal circuit; and
   a controller; wherein
   the electric circuitry includes:
      external relays corresponding to the respective battery packs to open and close respective circuits connecting the respective corresponding battery packs to the electric device;
   each of the battery packs includes a pre-charge circuit, the pre-charge circuit including a series circuit including a pre-charge resistor and a pre-charge relay and connected in parallel to the at least one internal relay; and
   the controller is configured or programmed to:
      specify each of the battery packs as a battery pack requiring pre-charging in which the pre-charge relay is brought into a closed state before the at least one internal relay is brought into the closed state or as a battery pack for which the pre-charging is to be skipped;
      in connecting one or more of the battery packs that have been specified as being a battery pack requiring the pre-charging to the electric device, perform the pre-charging and then perform a first connecting process to bring the at least one internal relay of the one or more of the battery packs into the closed state; and
      in connecting one or more of the battery packs that have been specified as a battery pack for which the pre-charging is to be skipped to the electric device, skip the pre-charging and perform the first connecting process.

5. The electric working machine according to claim 1, wherein
   the at least one internal relay of each of the battery packs includes a first internal relay on a positive side and a second internal relay on a negative side; and
   the controller is configured or programmed to:
      specify whether to bring the first internal relay and the second internal relay concurrently into the closed state in the first connecting process;
      if the controller has specified bringing the first internal relay and the second internal relay concurrently into the closed state, bring the first internal relay and the second internal relay concurrently into the closed state in the first connecting process.

6. The electric working machine according to claim 4, wherein
   the at least one internal relay of each of the battery packs includes a first internal relay on a positive side and a second internal relay on a negative side; and the controller is configured or programmed to:
specify whether to bring the first internal relay and the second internal relay concurrently into the closed state in the first connecting process;
if the controller has specified bringing the first internal relay and the second internal relay concurrently into the closed state, bring the first internal relay and the second internal relay concurrently into the closed state in the first connecting process.

7. The electric working machine according to claim 1, wherein the controller is configured or programmed to:
specify a first battery pack as being a battery pack to undergo the pre-charging, the first battery pack being one of the battery packs that is to be connected first to the electric device; and
specify a second battery pack as being a battery pack for which the pre-charging is to be skipped, the second battery pack being one of the battery packs that is to be connected second or later to the electric device.

8. The electric working machine according to claim 4, wherein the controller is configured or programmed to:
specify a first battery pack as being a battery pack to undergo the pre-charging, the first battery pack being one of the battery packs that is to be connected first to the electric device; and
specify a second battery pack as being a battery pack for which the pre-charging is to be skipped, the second battery pack being one of the battery packs that is to be connected second or later to the electric device.

9. The electric working machine according to claim 7, wherein the controller is configured or programmed to perform, in connecting the battery pack to undergo the pre-charging to the electric device:
a first former process to bring the one of the external relays that corresponds to the battery pack into the closed state;
a second former process to bring the pre-charge relay of the battery pack into the closed state; and
a third former process to bring the at least one internal relay of the battery pack into the closed state after the first former process and the second former process.

10. The electric working machine according to claim 8, wherein the controller is configured or programmed to perform, in connecting the battery pack to undergo the pre-charging to the electric device:
a first former process to bring the one of the external relays that corresponds to the battery pack into the closed state;
a second former process to bring the pre-charge relay of the battery pack into the closed state; and
a third former process to bring the at least one internal relay of the battery pack into the closed state after the first former process and the second former process.

11. The electric working machine according to claim 2, wherein the controller is configured or programmed to select, as the first battery pack, one of the battery packs that corresponds to one of the external relays that has been opened and closed a greatest number of times.

12. The electric working machine according to claim 2, wherein the controller is configured or programmed to use different ones of the battery packs as the first battery pack in turn by changing the first battery pack every time the controller performs a process to connect the battery packs to the electric device.

13. The electric working machine according to claim 1, further comprising a working device to perform work; wherein
the electric device is operable to drive the working device directly or indirectly.

* * * * *